US012703800B2

(12) United States Patent
Tiwari et al.

(10) Patent No.: US 12,703,800 B2
(45) Date of Patent: Aug. 11, 2026

(54) ROBUST SUPERHYDROPHOBIC MATERIAL AND COATING

(71) Applicant: UCL BUSINESS LTD, London (GB)

(72) Inventors: Manish Tiwari, Greater London (GB); Zhuyan Chen, Greater London (GB); Chaoyi Peng, London (GB)

(73) Assignee: UCL VENTURES LIMITED, London (GB)

( * ) Notice: Subject to any disclaimer, the term of this patent is extended or adjusted under 35 U.S.C. 154(b) by 58 days.

(21) Appl. No.: 16/485,002

(22) PCT Filed: Feb. 9, 2018

(86) PCT No.: PCT/EP2018/053283
§ 371 (c)(1),
(2) Date: Aug. 9, 2019

(87) PCT Pub. No.: WO2018/146252
PCT Pub. Date: Aug. 16, 2018

(65) Prior Publication Data

US 2020/0123392 A1 Apr. 23, 2020

(30) Foreign Application Priority Data

Feb. 10, 2017 (GB) ..................................... 1702279

(51) Int. Cl.
*C09D 5/00* (2006.01)
*C08L 27/18* (2006.01)
*C09D 7/40* (2018.01)
*C09D 7/65* (2018.01)
*C09D 127/18* (2006.01)

(52) U.S. Cl.
CPC ................ *C09D 5/00* (2013.01); *C08L 27/18* (2013.01); *C09D 7/65* (2018.01); *C09D 7/67* (2018.01); *C09D 127/18* (2013.01); *C08L 2205/03* (2013.01); *C08L 2205/14* (2013.01)

(58) Field of Classification Search
CPC ... C09D 5/00; C09D 7/65; C09D 7/67; C09D 127/18; C08L 27/18; C08L 2205/03; C08L 2205/14
USPC .......................................................... 524/502
See application file for complete search history.

(56) References Cited

U.S. PATENT DOCUMENTS 3,595,925 A * 7/1971 Garth ................... C07C 43/126
568/615
2014/0113144 A1 4/2014 Loth et al.
2014/0127516 A1 5/2014 Wang et al.
2015/0344748 A1* 12/2015 Wohl ................ C08G 59/1438
427/512
2016/0208111 A1 7/2016 Hurley

FOREIGN PATENT DOCUMENTS

WO WO2014035742 A2 3/2014

OTHER PUBLICATIONS

Tesler, A. B. et al. Extremely durable biofouling-resistant metallic surfaces based on electrodeposited nanoporous tungstite films on steel. Nat Commun 6, 8649, (2015).
Mates, J.E., Bayer, I. S., Palumbo, J.M., Carroll, P. J. & Megaridis, C. M. Extremely stretchable and conductive water-repellent coatings for low-cost ultra-flexible electronics. Nat Commun 6, 8874, (2015).
Yang, H. et al. Lotus leaf inspired robust superhydrophobic coating from strawberry-like Janus particles. NPG Asia Materials 7, e176, (2015).
Lu, Y. et al. Robust self-cleaning surfaces that function when exposed to either air or oil. Science 347, 1132-1135 (2015).
Steele, A., Bayer, I. & Loth, E. Adhesion strength and superhydrophobicity of polyurethane/organoclay nanocomposite coatings. Journal of Applied Polymer Science 125, E445-E452, (2012).
Deng, X., Mammen, L., Butt, H.-J. & Vollmer, D. Candle Soot as a Template for a Transparent Robust Superamphiphobic Coating. Science 335, 5 (2012).
Azimi, G., Dhiman, R., Kwon, H. M., Paxson, A. T. & Varanasi, K. K. Hydrophobicity of rare-earth oxide ceramics. Nat Mater 12, 315-320, (2013).
Feng, L. et al. Superhydrophobicity of Nanostructured Carbon Films in a Wide Range of pH Values. Angewandte Chemie 115, 4349-4352, (2003).
Wang, C.-F. et al. Stable Superhydrophobic Polybenzoxazine Surfaces over a Wide pH Range. Langmuir 22, 4 (2006).

* cited by examiner

*Primary Examiner* — Kelechi C Egwim
(74) *Attorney, Agent, or Firm* — Stites & Harbison, PLLC; Richard S. Myers, Jr.

(57) ABSTRACT

The invention provides a composition for forming a hydrophobic material, the composition being made by combining: a perfluorinated amine compound comprising at least two amine moieties, such as a compound made by combining a straight or branched chain $C_{1-10}$ alkyl amine having at least two amine groups per molecule, with a straight or branched chain $C_{1-12}$ perfluorinated carboxylic acid confining at least one —COOH group per molecule; an epoxy compound comprising at least two epoxy moieties; a lubricant, such as a perfluorinated polyether; a population of nanoparticles; and a solvent. Hydrophobic materials formed by evaporation of the solvent from such a composition are also provided as are intermediates excluding the lubricant which are used in the formation of such compositions. Such compositions are used in the formation of hydrophobic and particularly superhydrophobic surfaces. Advantageously these compositions are useful to form robust surface coatings that are resistant to mechanical wear.

15 Claims, 15 Drawing Sheets

ROBUST SUPERHYDROPHOBIC MATERIAL AND COATING

CROSS REFERENCE TO RELATED APPLICATIONS

This application is a § 371 National State Application of PCT/EP2018/053283 filed Feb. 9, 2018 which claims priority to GB 1702279.9 filed Feb. 10, 2017.

TECHNICAL FIELD

The present disclosure relates to robust water-repellent "superhydrophobic" materials; the use of these materials to form superhydrophobic coatings; and methods of making such materials. Articles formed from or coated with these materials are also considered as part of the present disclosure, as are methods of making such articles.

BACKGROUND

Superhydrophobic coatings are known in the art both in natural materials, such as lotus leaves, water strider legs, and butterfly wings, and also in artificial materials. Artificial superhydrophobic materials demonstrating mechanical robustness (non-patent reference 1,2), good substrate adhesion (non-patent reference 3-5), ability to sustain some level of abrasion (non-patent reference 6), temperature stability (non-patent reference 7), and chemical resistance (non-patent reference 8-9) are known in the art. However, good performance in one of these parameters tends to occur to the detriment of performance in one or more of the other parameters. It is rare to find good performance in more than one of these parameters and materials showing good performance in large numbers or all of these areas are not known. For example, coatings including inorganic nanoparticles or building blocks (e.g. $TiO_2$, $SiO_2$, rare earth oxides, etc.) offer good mechanical robustness, but they are susceptible to chemical degradation, especially with strong acids and bases. Similarly, organic coatings have good chemical resistance, but poor mechanical properties.

Slippery Liquid-Infused Porous Surfaces (known as "SLIPS") are also known and provide some useful hydrophobic and, in some cases, superhydrophobic properties. However, these rely on infusion of a textured surface with a liquid lubricant to form a surface lubricant layer which imparts some of the hydrophobic properties. This lubricant can, in some cases, evaporate, leach away, or otherwise be depleted over time which impairs the hydrophobic surface properties. Furthermore, these SLIPS are a surface phenomenon, the hydrophobic properties are not embedded in the material itself; rather they are formed at the surface by infusion of a lubricant into the surface structure. As such they are susceptible to abrasion or surface mechanical damage which breaches the hydrophobic layer and reveals the non-hydrophobic bulk material.

So there remains a desire for superhydrophobic materials, particularly surfaces and coatings, that show good substrate adhesion, good mechanical and chemical robustness, and long-lasting superhydrophobic behaviour.

REFERENCES

Patent References

US 2014/0127516 describes a composite surface coating for preventing ice adhesion which includes a superhydrophobic or superhydrophilic surface with an adsorbed low freezing point liquid, an example of which may be a perfluoropolyether.

US 2016/0208111 describes durable, flexible, superhydrophobic surfaces comprising a polyurethane base composition incorporating micro- or nano-particles.

WO 2014/035742 describes sprayable superhydrophobic coatings comprising hydrophobic nanoparticles, which may include polytetrafluoroethylene (PTFE) particles, and a hydrophilic solvent comprising an amphiphilic silicone-containing resin.

Non-Patent References

1) Tesler, A. B. et al. Extremely durable biofouling-resistant metallic surfaces based on electrodeposited nanoporous tungstite films on steel. *Nat Commun* 6, 8649, (2015).

2) Mates, J. E., Bayer, I. S., Palumbo, J. M., Carroll, P. J. & Megaridis, C. M. Extremely stretchable and conductive water-repellent coatings for low-cost ultra-flexible electronics. *Nat Commun* 6, 8874, (2015).

3) Yang, H. et al. Lotus leaf inspired robust superhydrophobic coating from strawberry-like Janus particles. NPG Asia Materials 7, e176, (2015).

4) Lu, Y. et al. Robust self-cleaning surfaces that function when exposed to either air or oil. Science 347, 1132-1135 (2015).

5) Steele, A., Bayer, I. & Loth, E. Adhesion strength and superhydrophobicity of polyurethane/organoclay nanocomposite coatings. Journal of Applied Polymer Science 125, E445-E452, (2012).

6) Deng, X., Mammen, L., Butt, H.-J. & Vollmer, D. Candle Soot as a Template for a Transparent Robust Superamphiphobic Coating. *Science* 335, 5 (2012).

7) Azimi, G., Dhiman, R., Kwon, H. M., Paxson, A. T. & Varanasi, K. K. Hydrophobicity of rare-earth oxide ceramics. *Nat Mater* 12, 315-320, (2013).

8) Feng, L. et al. Superhydrophobicity of Nanostructured Carbon Films in a Wide Range of pH Values. Angewandte Chemie 115, 4349-4352, (2003).

9) Wang, C.-F. et al. Stable Superhydrophobic Polybenzoxazine Surfaces over a Wide pH Range. Langmuir 22, 4 (2006).

SUMMARY

In one aspect, the present proposals provide a composition for forming a hydrophobic material, the composition made by combining:

- a perfluorinated amine compound comprising at least two amine moieties;
- an epoxy compound comprising at least two epoxy moieties;
- a lubricant;
- a population of nanoparticles; and
- a solvent.

The present proposals also provide a hydrophobic material formed by evaporation of solvent from a composition as defined herein to give a hydrophobic material comprising:

- a cured perfluorinated epoxy resin;
- a lubricant; and
- a population of nanoparticles.

The present proposals also provide an intermediate for forming a composition as defined herein, wherein the intermediate is made by combining:

an epoxy compound comprising at least two epoxy moieties;

a perfluorinated polyether;

a population of nanoparticles; and a solvent.

The lubricant is preferably a perfluorinated polyether or a silicone oil, most preferably a perfluorinated polyether as defined herein.

In preferred embodiments, the nanoparticles are fluorinated nanoparticles, such as PTFE nanoparticles.

Also provided is a kit comprising an intermediate according to the present proposals, and a perfluorinated amine compound comprising at least two amine moieties.

Also provided is an article made from or coated with a composition or a hydrophobic material as defined herein.

The present proposals also provide a method of applying a hydrophobic coating to an article, the method comprising applying a composition as defined herein to the surface of the article, and subsequently evaporating the solvent from the composition to give a hydrophobic coating.

The present proposals also provide a method of forming a hydrophobic article, the method comprising filling a mold with a composition as defined herein, and subsequently evaporating the solvent from the composition to provide the hydrophobic article.

FURTHER DEFINITIONS; OPTIONS; AND PREFERENCES

Figure 1:
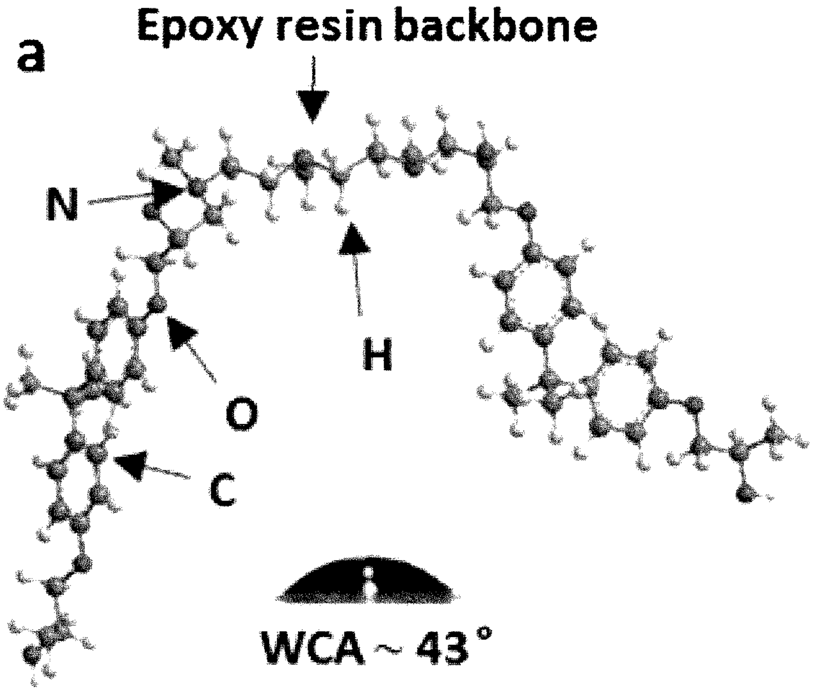
FIG. 1 shows a coating formed only from an epoxy resin as set out in Example 11.

The term "superhydrophobic" as used herein may be defined as a material on which a water droplet has a surface contact angle of 150° or greater. Additionally or alternatively "superhydrophobic" may be defined as a material having a contact hysteresis with a water droplet of less than 10°. This means that when a water droplet is placed on the surface of the material and the material is tilted, the difference between the contact angle at the advancing (lower) edge of the droplet and the contact angle at the receding (upper) edge of the droplet at the point when the droplet start to move across the surface is less than 10°. The contact angle hysteresis ($\Delta\theta$) can also be determined by gradually increasing (decreasing) the volume of a droplet on the surfaces and recording the advancing (receding) contact angles (denoted as $\theta_A$ and $\theta_R$, respectively) of the droplet.

The present proposals provide a fluid composition that can be used to form a hydrophobic material; the hydrophobic material itself (including both coatings of the hydrophobic material and items formed form the hydrophobic material); intermediates used to form the fluid composition; and kits comprising the intermediate and used to form the fluid composition.

These proposals also provide methods of making the fluid composition and methods of making a hydrophobic material from the fluid composition.

The fluid composition according to the present disclosure is made by combining:

a perfluorinated amine compound comprising at least two amine moieties;

an epoxy compound comprising at least two epoxy moieties;

a lubricant;

a population of nanoparticles; and a solvent.

In these compositions, the perfluorinated amine compound and the epoxy compound may react to some degree while the composition remains in the fluid state. However, insofar as these two components have not reacted in the fluid composition, they do react as the solvent is evaporated from the composition, to form a hydrophobic material when the solvent is substantially all evaporated.

The hydrophobic material formed in this way comprises:

a cured perfluorinated epoxy resin;

a lubricant; and a population of nanoparticles.

Importantly the present hydrophobic materials comprise all three of the above listed components. Omission of any one of these components results in significant degradation of the beneficial properties of the material, for example reduction in the Water Contact Angle (WCA) of a water droplet on the surface of the material.

In preferred aspects, the lubricant is a perfluorinated polyether or a silicone compound (e.g. a silicone oil) as defined here, preferably a perfluorinated polyether.

Methods of forming the present fluid compositions and hydrophobic materials also form part of the present disclosure. The methods of forming the fluid compositions are not particularly limited. Typically they involve intimate mixing of the relevant components to form a stable fluid suspension of nanoparticles in the liquid components.

Formation of a hydrophobic material from such a fluid composition comprises evaporating the solvent from the composition, preferably by heating in air, for example between about 80 and 120° C., e.g. at about 100° C. for about 1 hour, or at about 80° C. for about 5 hours, to form a hydrophobic material. In some preferred aspects, the fluid composition is applied to a substrate prior to evaporation of the solvent so the hydrophobic material is formed as a coating on the substrate. In some aspects the fluid composition may simply be poured into a mold before the solvent is evaporated leaving a hydrophobic material as a cast block of the material assuming the shape of the mold.

An important feature of the hydrophobic materials described herein is that they are of relatively uniform composition. This means that the hydrophobic properties are exhibited throughout the material with the result that if the surface of the material is damaged, e.g. by abrasion or physical damage, the hydrophobic properties are retained because the material revealed by the damage has the same composition and exhibits the same properties as the material at the surface. This property also means that the present materials can be worn away to a certain degree without loss of beneficial properties, e.g. hydrophobic behaviour. This is different to many surface coating technologies in which any beneficial properties are confined to the surface layer and may be dependent on surface morphology with the consequence that any damage that breaches the surface layer may compromise the beneficial properties. This is the case with many hydrophobic surface technologies such as nanostructured surfaces and some SLIPS surfaces. Therefore the present compositions can provide a surface coating having a much longer lifetime that known superhydrophobic surfaces. Furthermore, the properties are inherent in the material and do not rely on addition or presence of a further surface coating or agent such as an oil or lubricant as required for SLIPS coatings, which may evaporate or disperse from the surface over time. Therefore a significant benefit of the present compositions, materials, and methods is that the hydrophobic materials that are formed are uniform in composition and demonstrate the beneficial properties throughout the material. This uniformity of composition means that the present compositions can be used to form monolithic or cast structures such as board, packaging, bricks, tiles etc. Such structures demonstrate the superhydrophobic properties throughout the structure meaning that even if the structure is damaged, e.g. by cutting, breaking, surface scratches etc., the superhydrophobic properties will not be compromised and no additional treatment of the damaged area (e.g. reinfusion with a lubricant oil) is needed.

The present hydrophobic materials exhibit excellent water repellent properties. In particular preferred embodiments, the materials are superhydrophobic. Preferably the materials have a water contact angle of 120° or more, preferably 130° or more, preferably 150° or more, more preferably 155° or more, more preferably 160° or more.

The present materials also preferably exhibit good water contact hysteresis. In preferred embodiments, the contact hysteresis is 15° or less, preferably 12° or less, preferably 10° or less.

The present materials also preferably exhibit low water drop sliding angles (WSA), i.e. the angle to which the substrate must be tilted away from horizontal before a water drop on the surface starts to slide. In preferred embodiments, the WSA is less than 10°, preferably less than 8°, preferably less than 5°, preferably less than 4°, preferably less than 3°.

The present materials also preferably demonstrate good physical robustness. For example, as demonstrated below, the materials can be exposed to high velocity water jets with no surface damage and minimal or no loss of hydrophobic properties. In some cases, the materials also show excellent resilience to abrasion with minimal or no loss of hydrophobic properties. This physical robustness is thought to be due, at least in part, to the use of an epoxy resin component in the material composition. However, many epoxy resins are inflexible and can crack if deformed. The use of the lubricant (e.g. perfluorinated polyether or silicone compound such as a silicone oil) component in the material composition helps to impart excellent mechanical flexibility to the present materials. For example, a surface coating of a preferred embodiment of the present material on a sheet of paper does not lose its hydrophobic (or even superhydrophobic) properties if the paper is crumpled into a ball and flattened out again.

The present materials are also preferably resistant to chemical degradation, as demonstrated below. In preferred aspects, the materials are resistant to chemical attack by highly oxidising and/or highly basic conditions, e.g. aqua regia and/or NaOH. This is particularly the case in preferred aspects where the material is formed from all organic components, i.e. does not contain inorganic components. In particular it is preferable that the nanoparticles in the present compositions as organic in nature, i.e. not inorganic, as these compositions demonstrate particularly good resistance to chemical attack. Additionally, these materials and compositions that are formed from all organic components also demonstrate good physical robustness.

The present materials preferably also exhibit excellent corrosion resistance. Corrosion resistance may, in some cases, encompass the resistance to chemical degradation mentioned above. However, corrosion resistance also includes degradation due to exposure to the air, particularly moisture and/or oxygen in the air (e.g. rusting or other surface oxidation of materials). Additionally, the corrosion resistance can also indicate resistance to salt (e.g. NaCl) solutions, as is typical in marine applications. Such corrosion resistance makes the present materials excellent candidates for the formation of corrosion resistant coatings, for example to protect corrosion-susceptible surfaces, such as ferrous metals and other structural metals such as aluminium, copper, titanium etc and their alloys.

In preferred aspects, the present materials demonstrate at least two, preferably at least three, preferably all of the above mentioned benefits.

While some of the above-mentioned benefits and properties of the present materials are known in the art, materials demonstrating multiple of these benefits are unusual or unknown. For example it is not known to provide a superhydrophobic material that is physically and chemically robust while also being flexible and having excellent adhesion to a substrate to which it has been applied.

Epoxy Resin

The present materials include a perfluorinated epoxy resin component. The use of an epoxy resin is beneficial because it results in excellent adhesion of the material to surfaces which means that the resultant coating is very robust and does not easily peel away from a surface to which it is adhered. Peeling of hydrophobic surfaces from the underlying substrate is a common mode of failure so this good adhesion is an improvement and a benefit of the present compositions. Furthermore, the use of an epoxy resin provides excellent chemical stability to the materials and can contribute to the corrosion resistant properties.

The epoxy resin is formed from an epoxy compound comprising at least two epoxy moieties and a perfluorinated amine compound comprising at least two amine moieties. Upon curing the amine groups and the epoxy groups react to form the epoxy polymer.

Epoxy Compound

The epoxy compound used to form the epoxy resin may be represented by the formula I below in which the nature of the R group is not particularly restricted as long as the epoxy compound contains at least two epoxy groups.

I

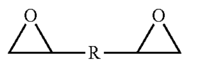

In some cases, the epoxy compound contains exactly two epoxy groups per molecule. In some cases, the epoxy compound may contain more than two epoxy groups per molecule, e.g. 3, 4, 5 or more epoxy groups per molecule.

Preferably the epoxy compound is selected from a bisphenol-based epoxy compound, such as a bisphenol di- or poly-glycidyl ether. In some preferred embodiments, the bisphenol-based epoxy compound is based on one or more of bisphenol-A, bisphenol-AP, bisphenol-B, bisphenol-BP, bisphenol-C, bisphenol-E, bisphenol-F, bisphenol-G, bisphenol-M, bisphenol-P, or bisphenol-PH; preferably bisphenol-A or bisphenol-F; more preferably bisphenol-A. In some cases, the bisphenol-based epoxy compound is a compound formed by reaction of one or more bisphenol compounds, e.g. one or more selected from the list presented above, with epichlorohydrin.

Perfluorinated Amine Compound

Figure 2:
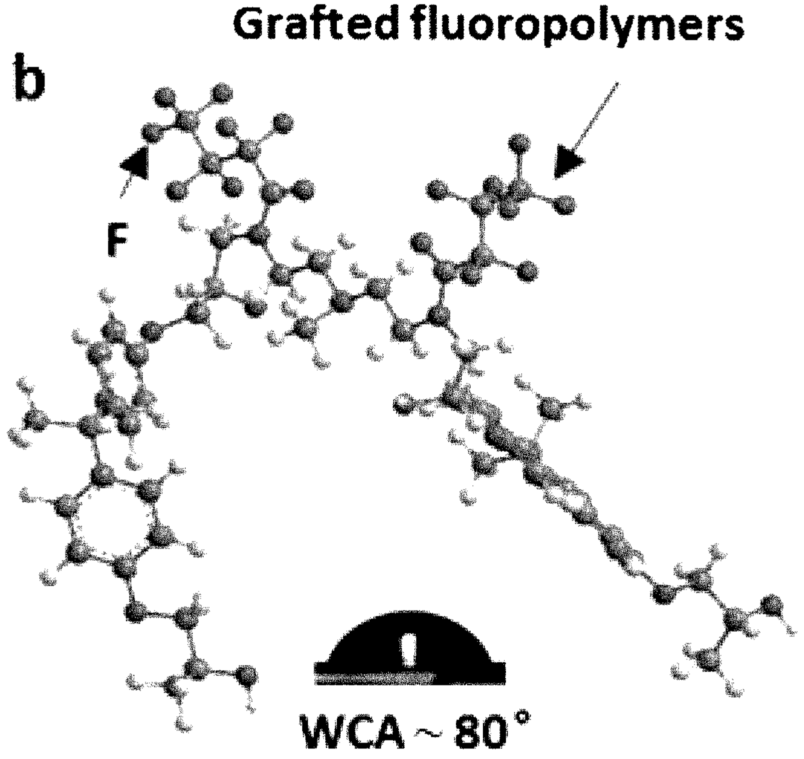
FIG. 2 shows a coating formed from an epoxy resin and a fluorinated amine as set out in Example 11.

The perfluorinated amine component is included in the present compositions as a means of introducing fluorination into the epoxy resin. This has the advantage of improving the hydrophobicity of the epoxy resin (as can be seen from a comparison of the water contact angle in FIG. 1 with that in FIG. 2). The use of a perfluorinated amine compound is thought to improve the hydrophobic behaviour of the present materials due to the presence of the flourine atoms in the compound.

The perfluorinated amine compound used to form the epoxy resin on reaction with the epoxy compound described herein, is not particularly limited as long as it contains at least two amine groups per molecule. The perfluorinated amine compound is typically formed by reaction of an amine, preferably a non-fluorinated amine, with a perfluorinated carboxylic acid.

This amine contains at least two amine groups per molecule. The amine may contain 2, 3, 4, or 5 amine groups per molecule. Preferably the amine contains exactly 3 amine groups per molecule.

The amine is preferably a straight or branched chain alkyl group having at least two amine groups per molecule. Preferably the amine is a straight chain amine having 1-10 carbon atoms and at least two amine groups per molecule. More preferably the amine is selected from diethylenetriamine, triethylenetetramine, tetraethylenepentamine, and ethylenediamine; preferably diethylenetriamine. The perfluorinated carboxylic acid used to react with the amine to form the perfluorinated amine compound is preferably a straight or branched chain alkyl carboxylic acid containing at least one —COOH group per molecule. In some cases, the backbone of this perfluorinated carboxylic acid may be a $C_{1-12}$ alkyl carboxylic acid, more preferably a $C_{1-6}$ alkyl carboxylic acid, more preferably a $C_{3-4}$ carboxylic acid.

The perfluorinated carboxylic acid may be fully fluorinated (i.e. all hydrogen atoms, apart from the H in —COOH, are replaced by fluorine atoms) or may be partially fluorinated.

Preferably the perfluorinated carboxylic acid is selected from trifluoroacetic acid, pentafluoropropionic acid, heptafluorobutyric acid, heptafluoroisobutyric acid, nonafluorovaleric acid, nonafluoroisovaleric acid, nonafluoropivalic acid. Also suitable are incomplete or partially fluorinated acids such as difluoroacetic acid, 3,3,3-trifluoropropionic acid, and 3,3,3-trifluoromethyl-2-trifluoromethylpropionic acid which function as volatile paired-ion compounds in a similar way to trifluoroacetic acid (TFA). Further options for the perfluorinated carboxylic acid may include fluroamino acids, such as (R,S)-5,7-difluorotryptophan hydrochloride, (R,S)-5,6,7-trifluorotryptophan hydrochloride, 2-amino-3-(4,5,6,7-tetrafluoro-1H-indol-3-yl)propionic acid hydrochloride, (R,S)-4,5,6,7-tetrafluorotryptophan hydrochloride etc.

Preferably the amine and the perfluorinated carboxylic acid are combined to form the perfluorinated amine compound in an amine:acid molar ratio of at least 1:0.75, preferably the ratio is in the range 1:0.75-1:2, more preferably 1:1-1:2, more preferably 1:1-1:1.5, more preferably about 1:1.

Where the amine contains more than one amine group per molecule, it may be preferable to combine the amine and the perfluorinated carboxylic acid in an amine:acid ratio as defined above but wherein the amount of acid component is multiplied by the number of amino groups per molecule in the non-fluorinated amine. For example if the non-fluorinated amine is a diamine, the relevant amine:acid molar ratio may be at least 1:1.5, preferably in the range 1:1.5-1:4, more preferably 1:2-1:4, more preferably 1:2-1:3, more preferably about 1:2.

In a preferred aspect, the perfluorinated amine compound is formed by combining heptafluorobutyric acid and diethylenetriamine, for example as shown in Scheme 1 below.

Scheme 1 a

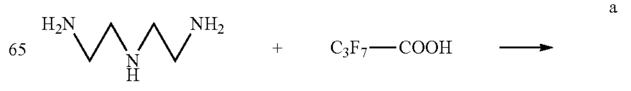

-continued

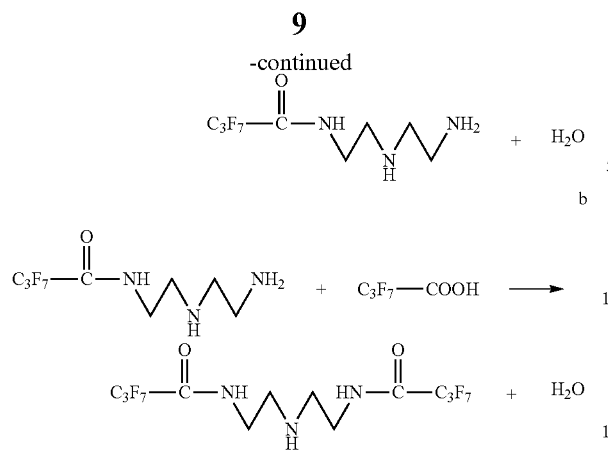

Part a of Scheme 1, shows a 1:1 acid:amine molar ratio and part b shows the subsequent reaction if an excess of acid component is used, e.g. in a 1:2 molar ratio.

Lubricant

The lubricant component is included to improve the flexibility of the materials and, in some cases also to further tune the hydrophobic behaviour. Known epoxy resin materials are often hard and brittle so inclusion of this lubricant component is important to achieve mechanical flexibility.

The lubricant component is preferably selected from perfluorinated polyethers and silicone compounds, such as silicone oils; preferably the lubricant is selected from perfluorinated polyethers.

Figure 3:
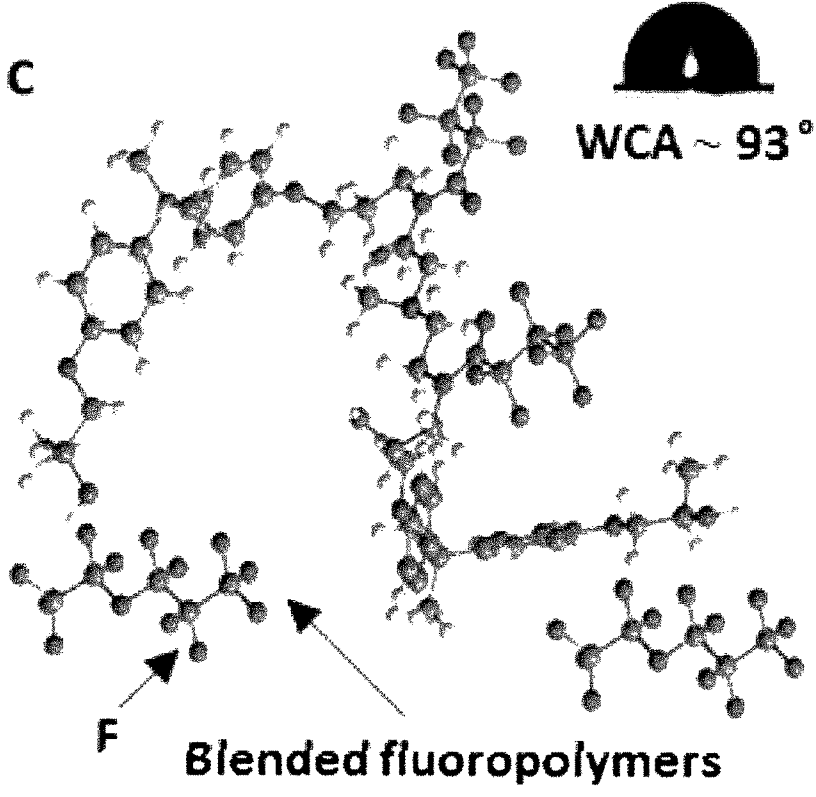
FIG. 3 shows a coating formed from an epoxy resin, a fluorinated amine, and a lubricant oil as set out in Example 11.

In preferred cases, e.g. where the lubricant is a perfluorinated polyether component, the improvements in mechanical flexibility can be achieved alongside improvements in hydrophobic properties. The improvement in hydrophobic behaviour can be seen from a comparison of the water contact angle in FIG. 3 with that in FIG. 1 and/or FIG. 2 and is thought to be at least partly attributed to the presence of fluorine atoms in the lubricant component.

The lubricant component is preferably a liquid at a standard room temperature and pressure (25° C. and 101325 Pa). The kinematic viscosity (25° C.) of the lubricant component is preferably lower than about 1500 cSt ($1500\times10^{-6}$ $m^2/s$), preferably lower than about 1000 cSt ($1000\times10^{-6}$ $m^2/s$).

In cases where the lubricant is a perfluorinated polyether component, it is preferably a perfluoroalkylether. In preferred cases, the alkyl chain of the monomer may be between 1 and 10 carbon atoms long, for example between about 1 and 6 carbon atoms long, preferably between about 2 and 4 carbon atoms long.

Preferred perfluorinated polyether components are selected from fluorocarbon ether polymers of polyhexafluoropropylene oxide, e.g. having a chemical formula II

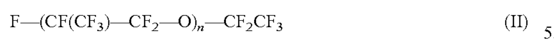

$$F—(CF(CF_3)—CF_2—O)_n—CF_2CF_3 \quad (II)$$

wherein the degree of polymerization, n, is typically in the range of 10 to 60. Such compounds are commercially available as the Krytox® range of oils from DuPont or Fomblin® range of oils from Solvay. Some preferred perfluorinated polyether components are Krytox® 1506, Krytox® 1514, Krytox® 1525, Fomblin® Y, LVAC and Fomblin® Y, HVAC etc. In preferred embodiments Krytox® 1506 is used.

In cases where the lubricant is a silicone compound, it is preferably a silicone oil or grease, most preferably a silicone oil e.g. poly(dimethyl-siloxane), poly(phenyl-methyl-siloxane), etc.

In some embodiments the lubricant is present at a level of 0.5-25 wt. %, preferably 1-20 wt. %, more preferably 1-15 wt. %, more preferably 1-10 wt. %, most preferably 1-5 wt. % of the overall composition (calculated excluding the solvent).

If too much of the lubricant component is included, this component starts to be present at the surface of the resultant hydrophobic material. This is comparable to Slippery Liquid-Infused Porous Surfaces (SLIPS) in which the liquid component is present at the surface of a coating. For example, where the lubricant is a liquid (as in preferred embodiments) if too much lubricant component is included, the surface of the resultant hydrophobic material appears wet, to touch and/or visual inspection. This is undesirable as it can mean that the lubricant can be transferred from the surface of the hydrophobic material by contact. One of the surprising benefits of the present compositions is that the hydrophobic material appears dry to both touch and visual inspection. Furthermore, it is found that if too much of the lubricant component is included, roll-off speed of a water drop placed on a surface of the material is impaired, possibly due to the roll-off speed being controlled by the viscosity of the lubricant at the surface. Therefore, it is undesirable to include the lubricant component in an amount greater than the upper limit mentioned above.

If too little lubricant is included, the beneficial properties, e.g. hydrophobicity indicated by water contact angle, start to become impaired.

Nanoparticles

Figure 4:
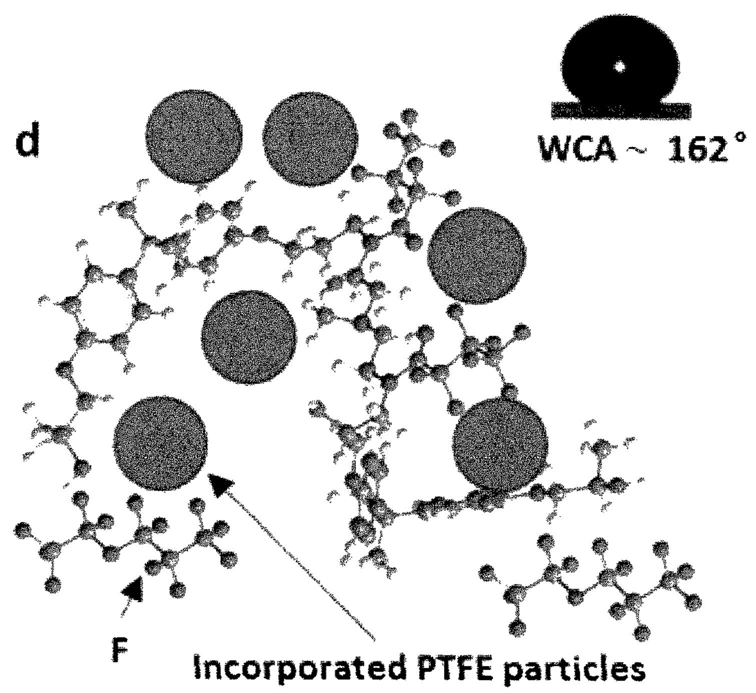
FIG. 4 shows a coating formed from an epoxy resin, a fluorinated amine, a lubricant oil, and PTFE nanoparticles as set out in Example 11.

Nanoparticles are included in the present compositions at least in part to introduce beneficial surface texture to the hydrophobic materials which improves the hydrophobic behaviour. Inclusion of the nanoparticles typically results in an improvement in hydrophobic behaviour as can be seen by comparing the water contact angle in FIG. 4 with that in FIG. 1, FIG. 2, or FIG. 3.

The nanoparticles in the present context preferably have a particle size (e.g. as measured by sieve analysis) in the range 1-1000 nm, preferably 10-750 nm, preferably 10-500 nm, preferably 50-500 nm, more preferably 50-250 nm, such as about 100-200 nm.

In preferred aspects, the amount of nanoparticles included in the composition is below about 80 wt. % of the composition excluding solvent (i.e. 80 wt. % of the overall composition including the perfluorinated amine compound, epoxy compound, lubricant, and nanoparticles, excluding the solvent). Above about 80 wt. % coatings formed from the composition by evaporation of the solvent typically start to show reduced adhesion to the coated substrate and reduced mechanical robustness. This is thought to be because the nanoparticles are typically relatively soft compared to the epoxy resin so an increased loading of nanoparticles typically decreases wear resistance of the material. Also, nanoparticles often display relatively weak interfacial bonding to the epoxy resin so increasing the loading of nanoparticles, particularly above a certain threshold, may reduce the overall physical robustness of the material. This is particularly the case when the nanoparticles are formed from the preferred polytetrafluoroethylene (PTFE) material. Preferably the amount of nanoparticles included in the composition is below about 80 wt. %, preferably about 75 wt. % or lower. At the lower end, the amount of nanoparticles included in the composition is preferably above about 10 wt. %, preferably about 20 wt. %, preferably above about 25 wt. %, more preferably above about 30 wt. % of the overall composition. In preferred aspects, the amount of nanoparticles included in the composition is in the range about 25 wt. % to about 75 wt. %.

The material from which the nanoparticles are formed may be selected from any inorganic or organic material, such as $Al_2O_3$, $TiO_2$, $SiO_2$, ZnO, MnO, PTFE, $CeO_2$, graphene, graphene oxide, carbon nanotubes, and carbon black. Preferably the material is itself hydrophobic, for example the material may be fluorinated. Preferably the material is an organic material, more preferably a fluorinated organic material. Organic nanoparticles such as PTFE, graphene, graphene oxide, carbon nanotubes, and carbon black, preferably PTFE, are preferred because they are typically more chemically robust than inorganic materials, for example $TiO_2$ and $SiO_2$ may be susceptible to chemical degradation.

Preferably PTFE nanoparticles are used because these have high intrinsic hydrophobic properties and are chemically inert, so the resultant hydrophobic material formed from the compositions has excellent hydrophobic properties combined with high resistance to chemical degradation and corrosion.

Solvent

The solvent in the present compositions is typically determined by compatibility with a substrate to which the composition is to be applied. In some preferred aspects, the solvent may be an organic solvent, e.g. selected from ketones or acetates, preferably acetone.

Intermediates

A further part of the present proposals relates to an intermediate for forming a composition according as described herein. The intermediate is made by combining:

- an epoxy compound comprising at least two epoxy moieties as defined herein;
- a lubricant as defined herein;
- a population of nanoparticles as defined herein; and
- a solvent as defined herein.

Such intermediates are useful because they are typically stable as a suspension of the nanoparticles in the liquid components for an extended period, e.g. more than 7 days, preferably more than 2 weeks, preferably more than 1 month, more preferably 2 months or more.

The intermediate can then be converted into a fluid composition as defined herein by addition of the perfluorinated amine compound to render it suitable for forming a hydrophobic material as defined herein.

Kits

A further proposal herein includes a kit comprising a first fluid comprising an intermediate as defined herein, and a second fluid comprising a perfluorinated amine compound comprising at least two amine moieties as defined herein. Optionally the perfluorinated amine component is provided in a solvent, typically the same solvent as used in the intermediate. Such kits may be used by mixing together the two components to form a fluid composition suitable for preparing a hydrophobic material on evaporation of the solvent.

Preferred Combinations

Any of the features and preferences described herein may be combined in any combination insofar as they are compatible. However, some preferred aspects are set out below.

In a preferred aspect, the composition for forming a hydrophobic material is made by combining:

- a perfluorinated straight chain diamine or triamine compound;
- a bisphenol-A based epoxy compound comprising at least two epoxy moieties;
- a lubricant which is a perfluorinated polyether selected from fluorocarbon ether polymers of polyhexafluoropropylene oxide;
- a population of organic nanoparticles, preferably PTFE nanoparticles; and
- an organic solvent.

In a more preferred aspect, the composition for forming a hydrophobic material is made by combining:

- diethylenetriamine;
- a bisphenol-A based epoxy compound, e.g. AIRSTONE™ 760E from Dow Chemical;
- a fluorocarbon ether polymer of polyhexafluoropropylene oxide, e.g. Krytox® 1506 oil;
- PTFE nanoparticles, e.g. having a polydisperse size profile between 100 nm and 200 nm; and
- acetone In a preferred aspect, the hydrophobic material is formed by evaporation of the solvent from a composition according to one of the above described preferred compositions

EXAMPLES

The following Examples are provided by way of illustration of the present proposals and do not limit the present disclosure.

Example 1—Suspension for Coating

The following steps were used to obtain a stable polymer/nanoparticle dispersion—to achieve multi-fluorination in a single pot—to be used to fabricate the nanocomposite coating via spraying or other scalable coating application methods.

First, 2.0 g bisphenol A based epoxy (AIRSTONE™ 760E, Dow) was dissolved in 5 ml acetone and, separately, 10.5 g PTFE nanoparticles with sizes of ~100 nm to ~200 nm (Sigma-Aldrich, UK) were dispersed in 30 ml of acetone by vigorous, magnetic stirring at 1000 rpm for 10 min. The epoxy solution was then mixed with the PTFE nanoparticle suspension and the mixture was stirred vigorously for 15 min to obtain PTFE/epoxy suspension.

Next, 0.3 g (corresponding to 75 wt. % loading of PTFE particles in the final dried coatings) of perfluoropolyether (Krytox® 1506 oil, Sigma-Aldrich, UK) was added to the PTFE/epoxy suspension. The mixture was stirred magnetically for 20 min at 1000 rpm, then sonicated in an ultrasonic bath for 15 min at room temperature followed by stirring again for 10 min to obtain a PTFE/Krytox/epoxy dispersion. This dispersion was highly stable and could be stored in sealed glass bottles at room temperature for more than one month.

Example 2—Coating Preparation

Synthesis of Fluorinated Amine Curing Agent

First, 0.01 mol diethylenetriamine (ReagentPlus®, 99%, Sigma-Aldrich, UK) was dissolved in 10 ml deionized water in a 100 ml beaker and stirred at 125 rpm on a magnetic stirrer plate. Separately, 0.01 mol heptafluorobutyric acid (≥99.5% (GC), Sigma-Aldrich, UK) was dissolved in 10 ml deionized water and added drop by drop to the magnetically stirred diethylenetriamine solution. The mixing initiated the fluorination reaction shown in Scheme 2 below.

Scheme 2 - Mechanism of fluorinated amine curing agent synthesis.

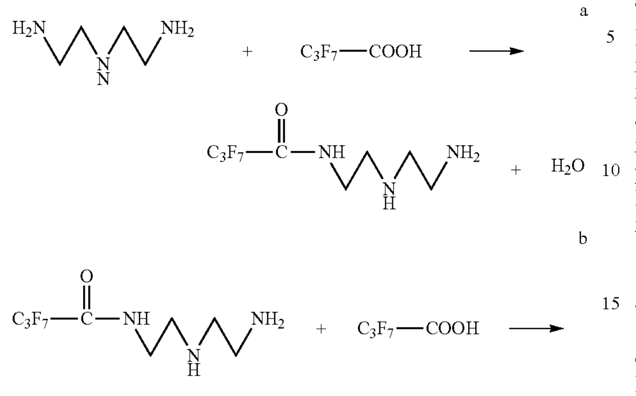

Coating Preparation 1.5 g of the F-amine synthesized above was dissolved in 10 ml acetone by stirring magnetically for 5 min at 300 rpm. The F-amine solution was then mixed with the PTFE/Krytox/epoxy suspension product from Example 1. The mixture was stirred for 5 min at 1000 rpm, sonicated for 15 min followed by a final 5 min stirring at 1000 rpm to obtain a well dispersed PTFE/Krytox/epoxy/F-amine suspension ready to be applied to substrates (e.g., glass, metal, plastics, polymer composite materials, etc.) through any of common large area coating techniques such as spraying, brushing or rolling.

After applying onto the substrate, in each case, as a final step the coatings were annealed in open air at ~100° C. for ~1 hour (or at ~80° C. for ~5 hours) to remove all the solvents and complete the epoxy curing. The epoxy hardening mechanism is illustrated below in Scheme 3. The PTFE/Krytox/epoxy/F-amine coatings may be referred to herein using the term “PKFE coatings”.

Scheme 3 - Hardening mechanism

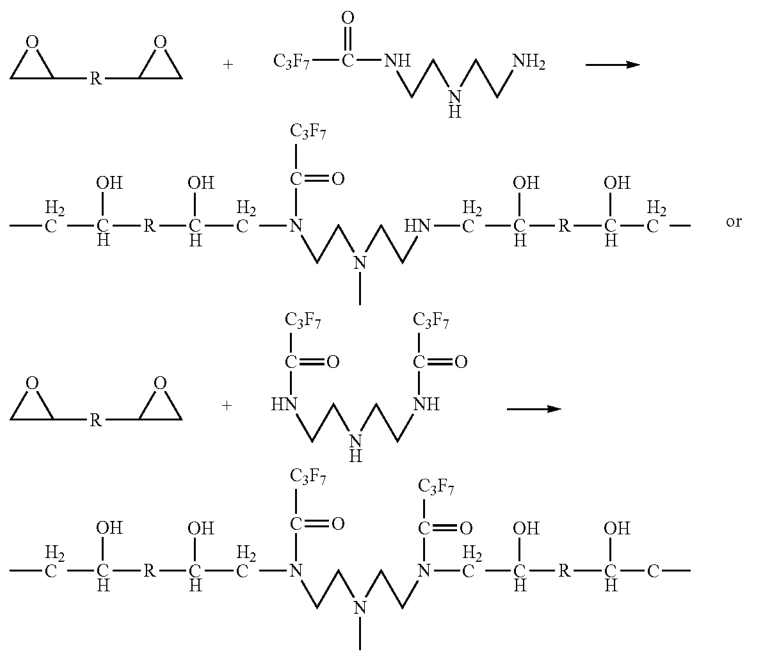

-continued

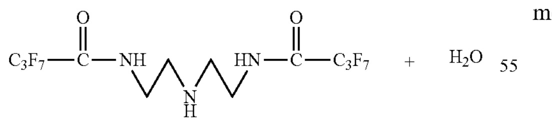

a, Heptafluorobutyric acid reaction with diethylenetriamine.
b, Excess heptafluorobutyric acid reaction with diethylenetriamine.

After adding all the heptafluorobutyric acid solution, the resulting mixture was heated to 100° C. to evaporate all the water and obtain the fluorinated amine (F-amine). The excess heptafluorobutyric acid will lead to further fluorination as shown in part b) of Scheme 2 above. The F-amine so obtained was used as a hardener for epoxy curing.

We tested the superhydrophobicity of PKFE coatings via WCA and WSA measurements through all these application methods; however, for ease of quick sample preparation most of the coatings samples were prepared by spraying.

Example 3—Tape Peel Test and Water Impact Test

A PKFE coating was prepared by spraying onto a glass microscope slide (sufficient spraying to cover the slide surface) and annealing using the methods as described in Examples 1 and 2 above.

Figure 5:
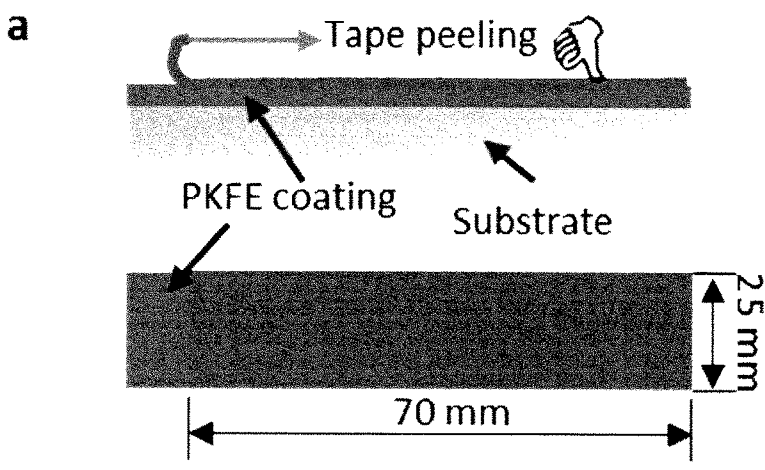
FIG. 5 shows the tape peel adhesion (part a) and results of tape peel experiments set out in Example 3 (part b).
Figure 5:
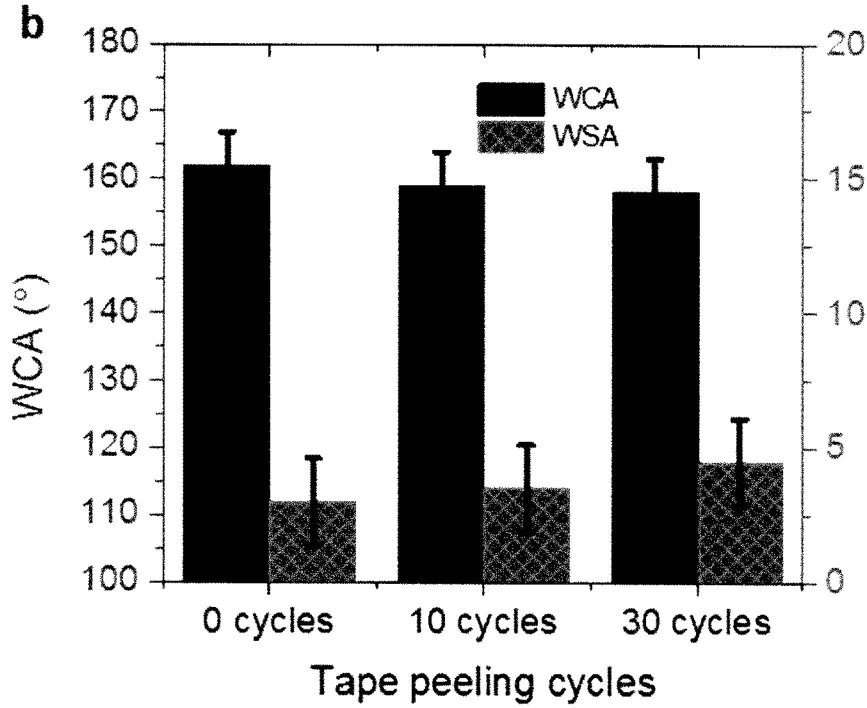

A strong bonding tape (VHB, 3M, with adhesion to steel value of 2,600 $Nm^{-1}$) was used to test the surface adhesion of the coating. The tape was pressed on the coating surface firmly by thumb as shown in FIG. 5*a* and then peeled off quickly (within 2 seconds)—the tape application and peel off comprised one cycle. The process of was repeated cyclically with contact angle measurements following each cycle. A fresh piece of tape was used for each peel off cycle. Results are shown in FIG. 5*b* in which "WCA" is the Water Contact Angle and "WSA" is the Water drop Sliding Angle, i.e. the angle to which the substrate must be tilted away from horizontal before a water drop on the surface starts to slide. FIG. 5*b* shows clearly that there is very little degradation in either WCA or WSA measurements even over 30 tape peel cycles. Single cycle peel off did not affect the drop contact and sliding angles, providing a first indication of the coating robustness. Ten peel off cycles caused a slight drop in the WCA, from 162° to ~158° and slight increase of water drop sliding angle (WSA) from <3° to <5° (see FIG. 5*b*). However, the coating maintained excellent water repellency even after 30 tape peel off cycles as shown in FIG. 5*b*. Water drops still beaded up on the surface and rolled off easily even after 30 tape peel cycles which is indicative of a highly robust surface coating and excellent adhesion of the coating to the substrate.

Figure 6:
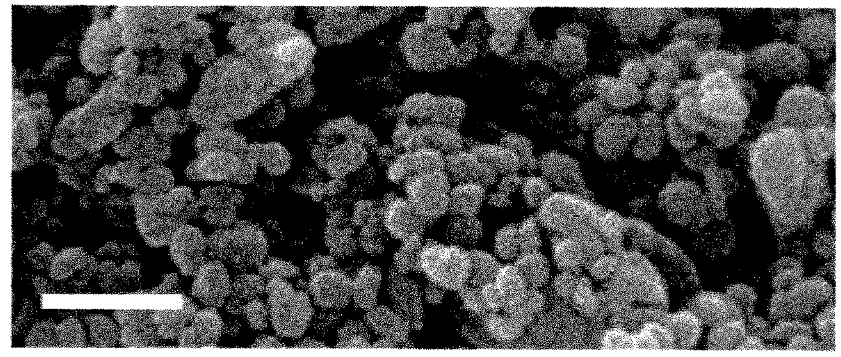
FIG. 6 shows a scanning electron microscope (SEM) image showing PKFE nanocomposite coating morphology featuring PTFE nanoparticles (100 nm to 200 nm) coated with fluorinated epoxy. Scale bar, 1 μm.
Figure 7:
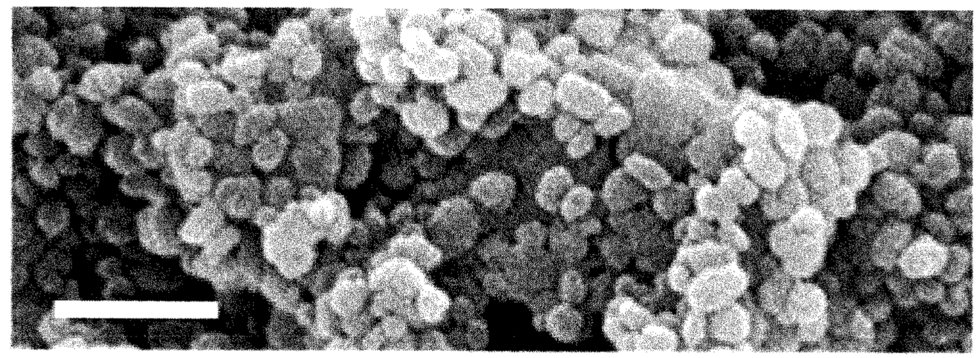
FIG. 7 shows an SEM image showing the morphology of a PKFE coating after 30 tape peel cycles, strong tape peeling caused no observable damage to the coating morphology. Scale bar, 1 μm.

SEM of the coatings before and after 30 tape peel cycles reveals no observable change in surface morphology (see FIG. 6 (before tape peel) and FIG. 7 (after 30 tape peel cycles).

Next, PKFE coated glass slides were subjected to ATSM D3359 standard tape peel test by creating blade cuts in a square grid form—grid spacing was 2 mm—followed by application of the VHB tape and peeling it off. To ensure uniform tape application a 4 kg load was rolled onto the tape applied to the coated slides. After peel off, the removal of coating on the tape was compared against the standard guideline (ATSM D3359) to determine the coating adhesion, which was found to lie between 4 B (less 5% of the coatings removed) and 5 B (no removal) for PKFE.

Figure 8:
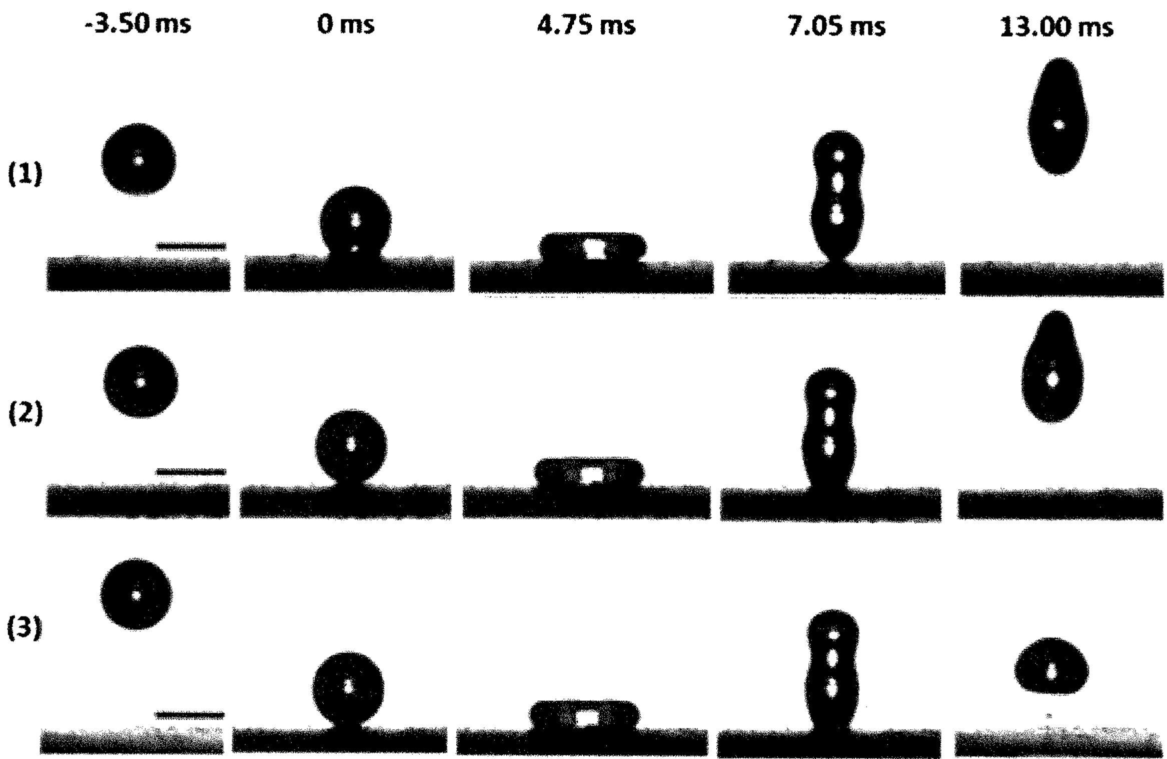
FIG. 8 shows results of water drop impact tests described in Example 3 (tape peel tests—lines 1 and 2 of FIG. 8) and Example 4 (abrasion test—lines 1 and 3 of FIG. 8).

Water drop impact tests were also performed with a water drop impacting at ~1.2 $ms^{-1}$. Complete bouncing of a water drop impacting at this speed was demonstrated and is shown in FIG. 8 in which row (1) shows results for a freshly formed coating and row (2) shows results after 30 tape peel cycles. This provides further indication of very little change in water repellency even after 30 tape peel cycles.

Example 4—Mechanical Abrasion Test

As in Example 3, a PKFE coating was prepared by spraying onto a glass microscope slide or 6 mm thick glass plates with a dimension of 10 cm×10 cm (sufficient spraying to cover the slide or the plate) and annealing using the methods as described in Examples 1 and 2 above. Abrasion tests were performed using two different methods. In the first method, 2 kg of beach sand (sands particle size: 100 μm to 1000 μm) was placed in a 1000 ml beaker. The beaker was hand shaken to even up the sand surface. A red line was drawn on the coated glass slide to mark a distance from the end of the slide as a standard depth for insertion into the sand. For each sand abrasion cycle, the coating sample was plunged quickly into the sand to a depth at which the sand surface was level with the red line, then withdrawn—plunging and withdrawal took ~2 s and constituted one sand abrasion cycle.

Tests were performed at 1 cm, 3 cm, and 5 cm insertion depths.

Figure 9A:
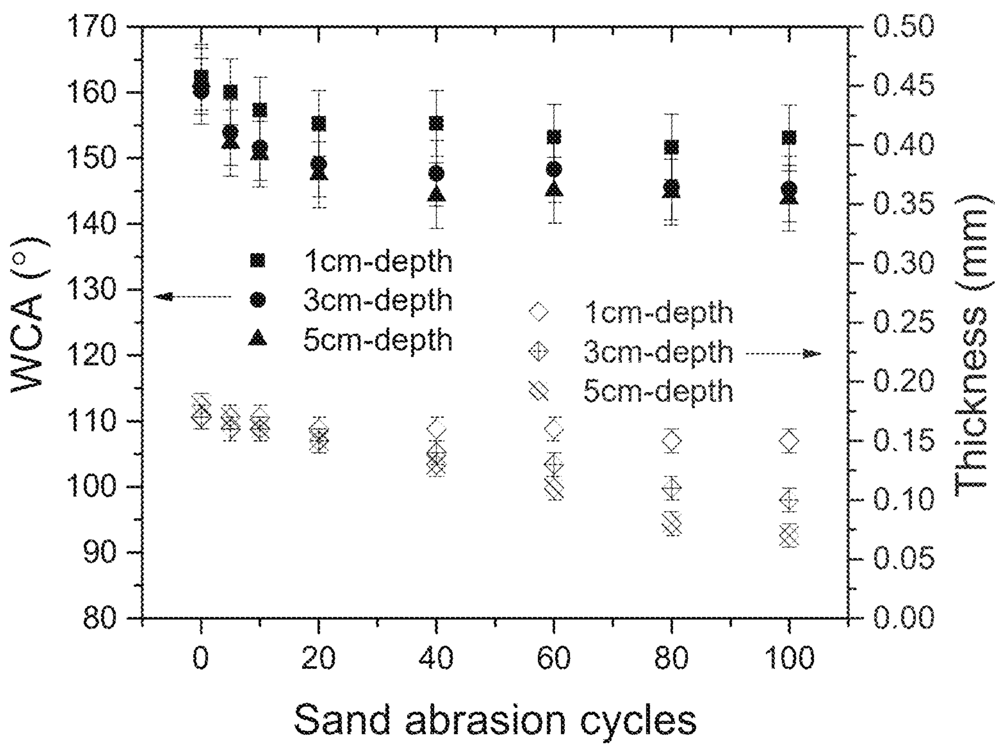
FIG. 9*a* shows results of abrasion testing using sand dipping and its effect on WCA and coating thickness reduction, described in Example 4.

The coating WCA and thickness was measured at three different depths (5 cm, 3 cm and 1 cm) of sand insertion and are plotted in FIG. 9*a*. Before measuring the WCA, the samples were rinsed clean by tap water.

After 100 abrasion cycles, the WCA of PKFE coating remained above 150° for the sand penetration depth of 1 cm and reduced to ~145° for 5 cm. Using a sand specific gravity of 2.5, hydrostatic pressure can be used as a first (conservative) estimate of abrasion pressures at the depths of 5 cm, 3 cm and 1 cm as 1.25 kPa, 0.75 kPa and 0.25 kPa, respectively. The progressively higher abrasion rate is also clear from the variation in coating thickness shown in FIG. 9*a* for the three penetration depths. In granular media the penetration resistance for partially penetrated objects increases supralinearly with penetration depth (with the corresponding scaling exponent>1.2), thus these estimates are conservative.

The demonstrated abrasion resistant water repellency can be attributed to the coating composition, which enables the PKFE nanocomposite coatings to maintain their texture even while being degraded by abrasion.

Figure 9B:
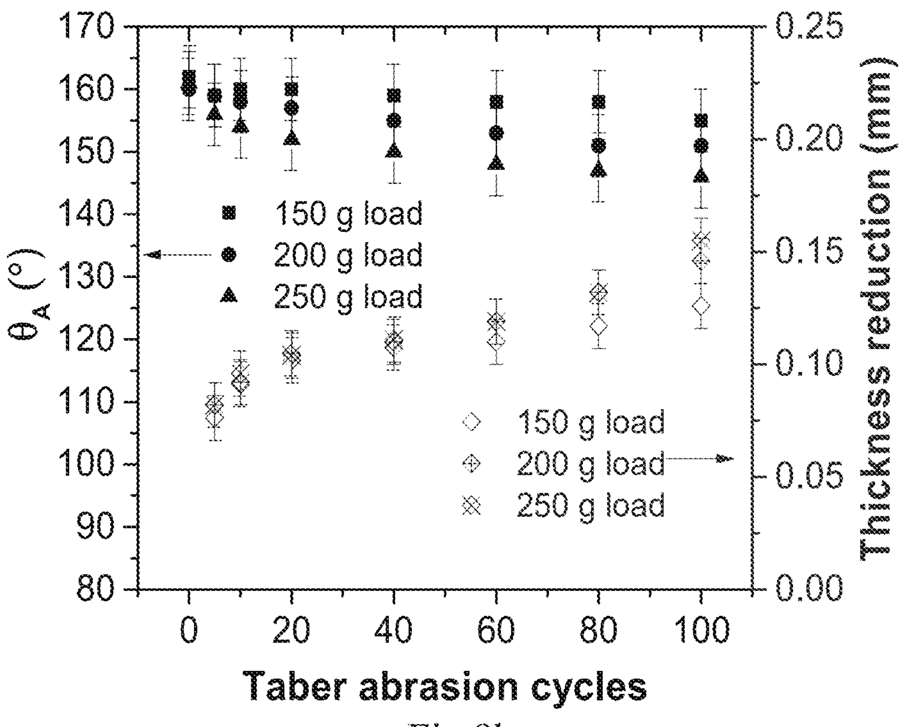
FIG. 9*b* shows results of abrasion testing using Taber abrasion tester and its effect on the advancing contact angle ($\theta_A$) and coating thickness reduction, described in Example 4.

In the second method, (10 cm×10 cm) coated glass plates were fitted on to a Taber abrasion tester (Elcometer, 5135 Single Head Abraser) and subjected to abrasion tests at three different loads of 100 g, 150 g, and 250 g, respectively in accordance with ASTM D4060 standard test. The results of the tests are plotted in FIG. 9*b* as function of abrasion cycles, where the plates were removed from the Taber tester after a given number of abrasion cycles and used to measure advancing contact angle ($\theta_A$) and contact angle hysteresis ($\Delta\theta$).

Figure 10:
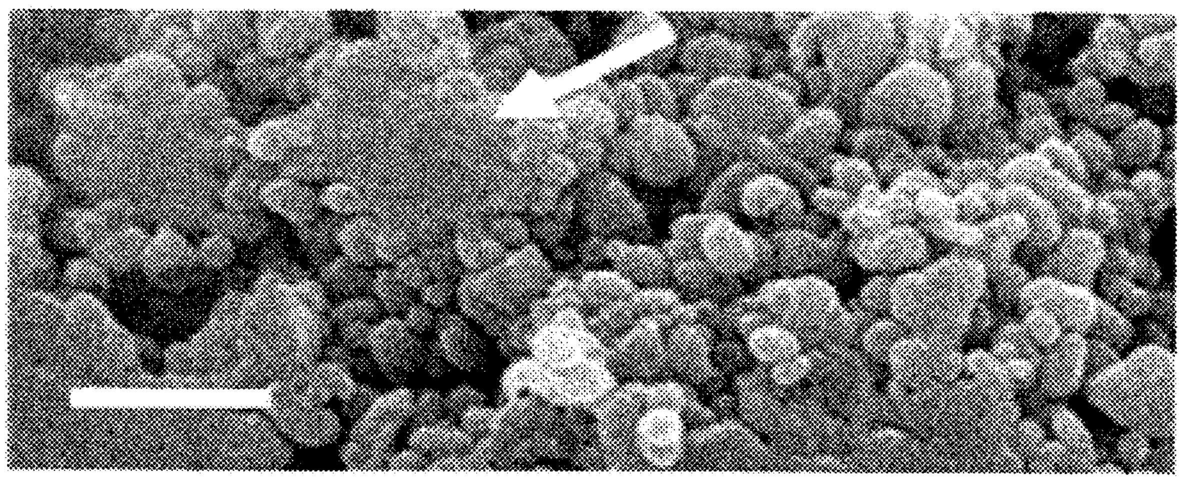
FIG. 10 is an SEM image after 100 cycles of sand abrasion as described in Example 4 with the white arrow showing an area of plastic deformation. Scale bar is 1 μm.

At sufficient abrasion strength (e.g. 5 cm depth in the sand dipping method), the degradation after 100 cycles was severe enough to result in the loss of the resistance to impalement by a drop impacting at 1.2 $ms^{-1}$. This degradation could be seen visually under SEM examination as shown in FIG. 10 (white arrow indicating abrasion damage) by comparison with the unabraded sample shown in FIG. 6. However, a complete drop bounce off and impalement resistance was maintained at 3 cm penetration depth even after 100 abrasion cycles. This is shown in row (3) of FIG. 8 by a comparison with the fresh coating results shown in row (1) of FIG. 8.

Example 5—Droplet Impact Test

Figure 11:
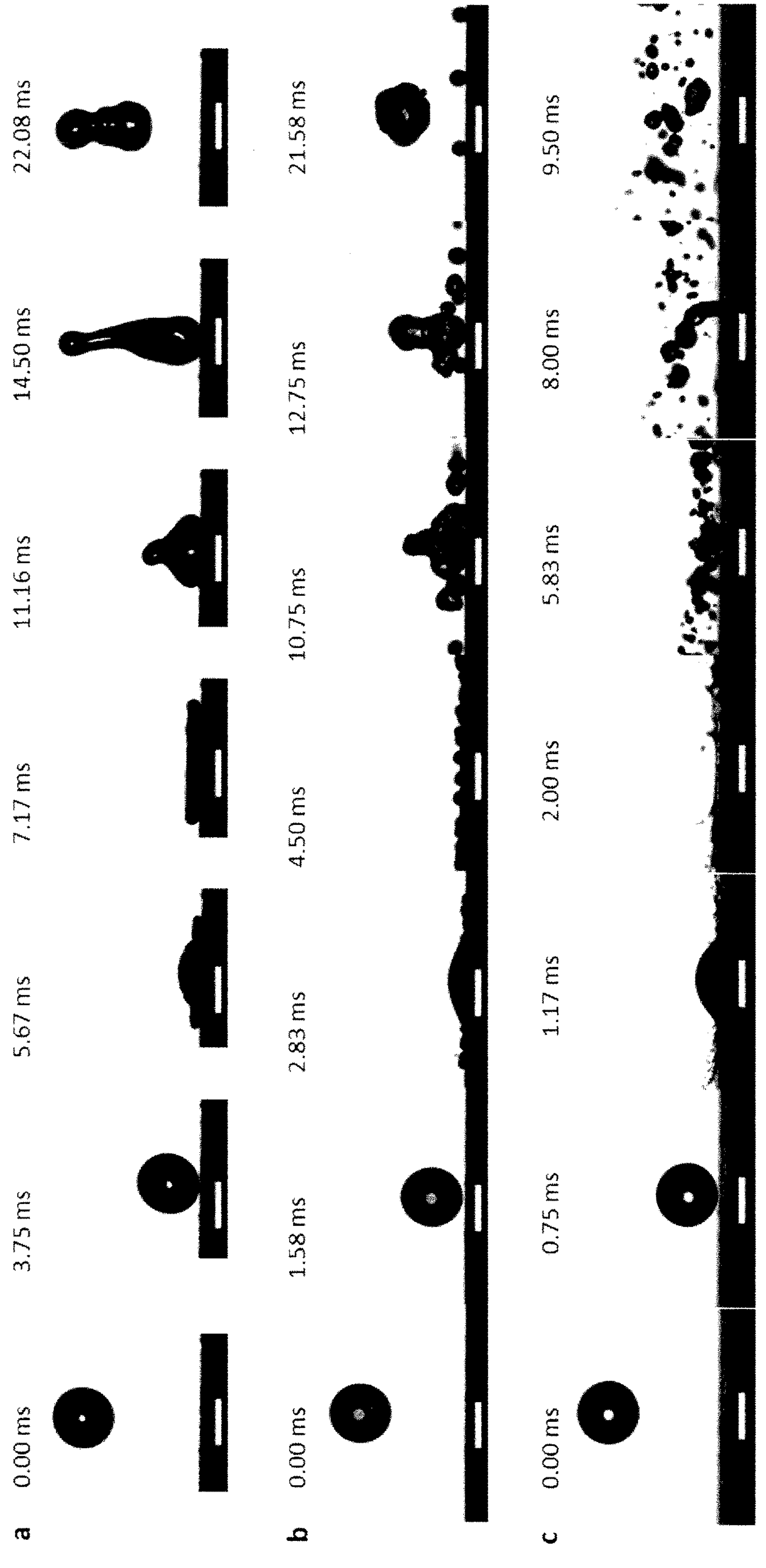
FIG. 11 shows water jet impact results as described in Example 5. a, Impact speed ~1.0 $ms^{-1}$, b, Impact speed ~2.0 $ms^{-1}$, c, Impact speed ~4.6 $ms^{-1}$. All scale bars, 2.5 mm.

For testing liquid impalement resistance of the PKFE coatings, water drop and water jet impact tests were used. The drop impact tests were performed by releasing individual water drops from a certain height to enable gravity led acceleration of the drops and achieve different impact speeds. FIG. 11 captures the key features of droplet impact process at three different speeds. Row (a) of FIG. 11 shows an impact speed of ~1.0 $ms^{-1}$ at which the water droplet does not break up; row (b) shows an impact speed of ~2.0 $ms^{-1}$ at which the water droplet starts to break up and the main body of the droplet bounces off, but few very small water droplets scatter on the surface; and row (c) shows an impact speed of ~4.6 $ms^{-1}$ at which the water droplet atomizes (breaks up) upon impact and its substrate contact time is reduced dramatically reduced to ~9.50 ms from ~22.08 ms for impact speed of ~1 $ms^{-1}$, i.e., a more than 50% reduction in contact time. This feature is beneficial when designing superhydrophobic surfaces for cold droplet impact resistance needed in anti-icing applications where a shorter contact time typically provides better anti-icing characteristics.

Example 6—Jet Impact Test

Figure 12:
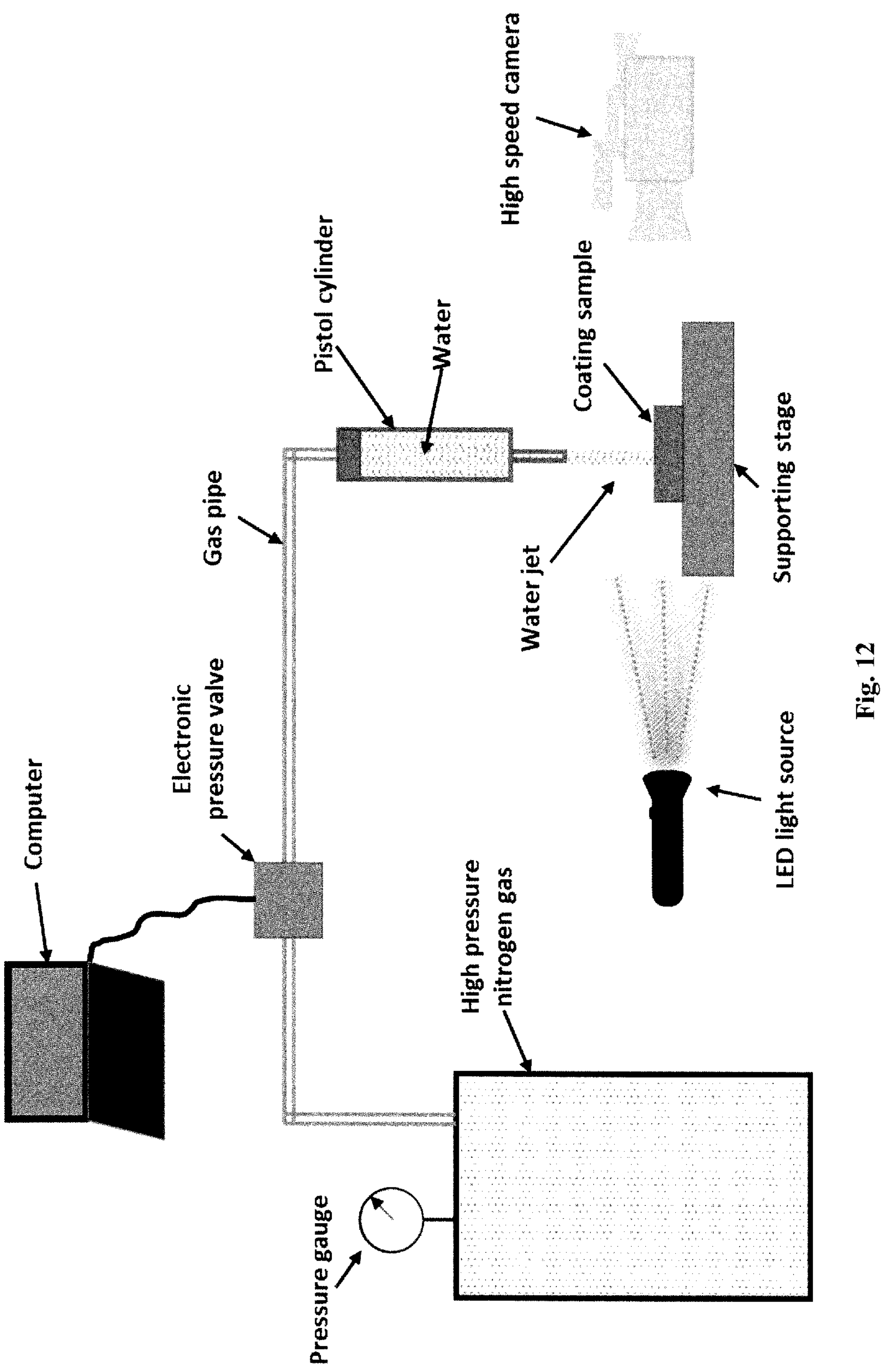
FIG. 12 shows the water jet impact apparatus described in Example 6.

The maximum attainable drop speed in gravity enabled acceleration is limited by terminal velocity. Thus for higher speed liquid impact tests, pressurised water jets were used. In order to obtain a stable and controllable water jet with high speed a system as shown in FIG. 12 was used. A high pressure nitrogen gas cylinder connected to an electronic pressure valve was used to force water through a nozzle connected to a piston (a needle/syringe assembly). The accuracy of electronic pressure valve was 0.1 bar. Different water jet velocities were obtained by tuning the gas pressure. The electronic pressure valve limited the back pressure on the piston to a maximum of 11 bar. With a nozzle diameter of 2.5 mm, the ensuing water jet could drain the cylinder volume of 4 ml in ~380 ms—recorded using the high speed camera. This is equivalent to an average jet speed of 21 $ms^{-1}$ for a water jet diameter of ~2.5 mm. The corresponding liquid Weber number ($We_l$) is calculated as $We_l=\rho_l V^2 d/\gamma_{LG}$—with $\rho_l$ denoting the liquid density, V as impact speed and d is the characteristic length scale, taken as the diameter for both the jet and drops. For the average jet speed of 21 $ms^{-1}$ and a water jet of ~2.5 mm, the Weber number, $We_l$ is ~15,000. However, due to system transients, upon application of pressure control signal on the electronic control valve, the gas back pressure on the piston ramps up to 11 bar. This transient process enables a time dependent rise in jet speed before levelling off to a steady rate corresponding to the maximum applied pressure. To unravel this transience, the motion of the piston/water interface inside the cylinder was recorded during typical jet impact process using the high speed camera. The motion of the piston could be used to determine the jet speeds through simple mass conservation and knowledge of cylinder and nozzle diameters. Thus, if in time Dt the piston in the cylinder moves by a distance Dh, equation 1 below applies.

$$\pi D^2 \mathrm{D}h/4=\pi d^2 V \mathrm{D}t4 \quad \text{(Equation 1)}$$

In which D is the cylinder diameter, d the nozzle (jet) diameter and V the jet speed.

Figure 13:
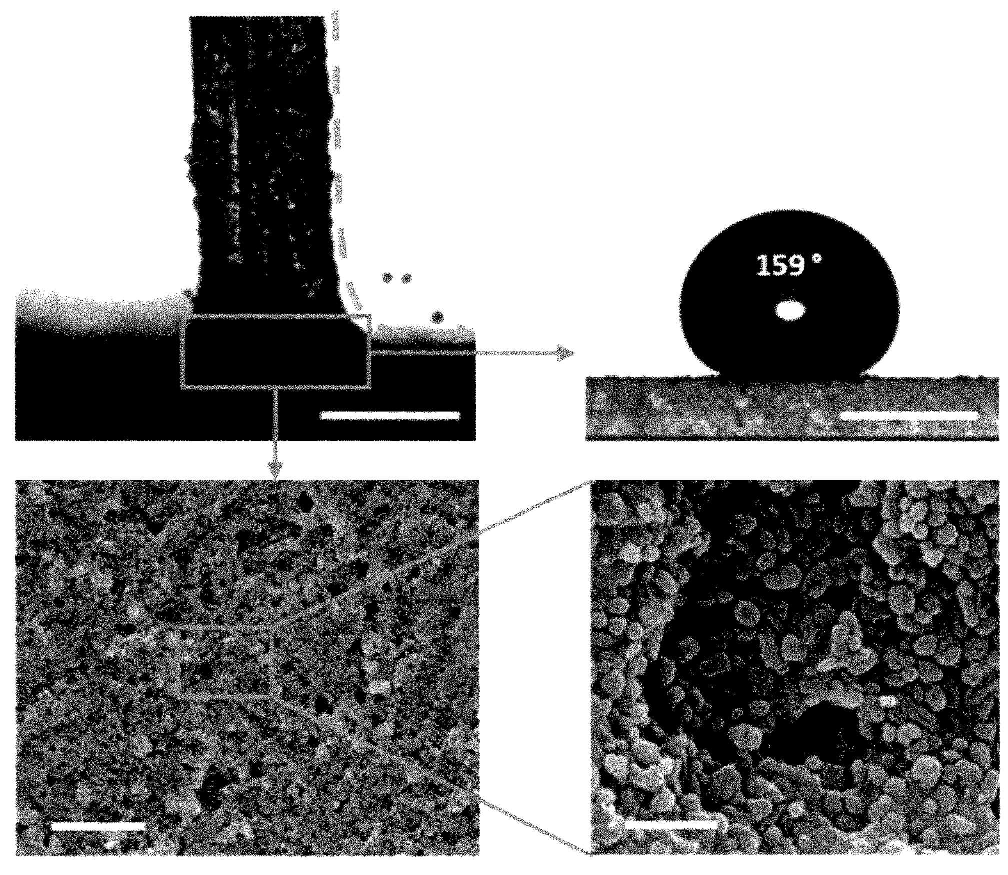
FIG. 13 shows results of the water jet impact tests described in Example 6.

Using fine jets (0.25 mm diameter), the water jet atomizes upon substrate impact at high speeds, while a larger jet forms a stagnation point at the point of impact and follows the axisymmetric stagnation flow trajectory as marked by the dotted line in the top left image of FIG. 13 as a simple guide to the eye.

Figure 14:
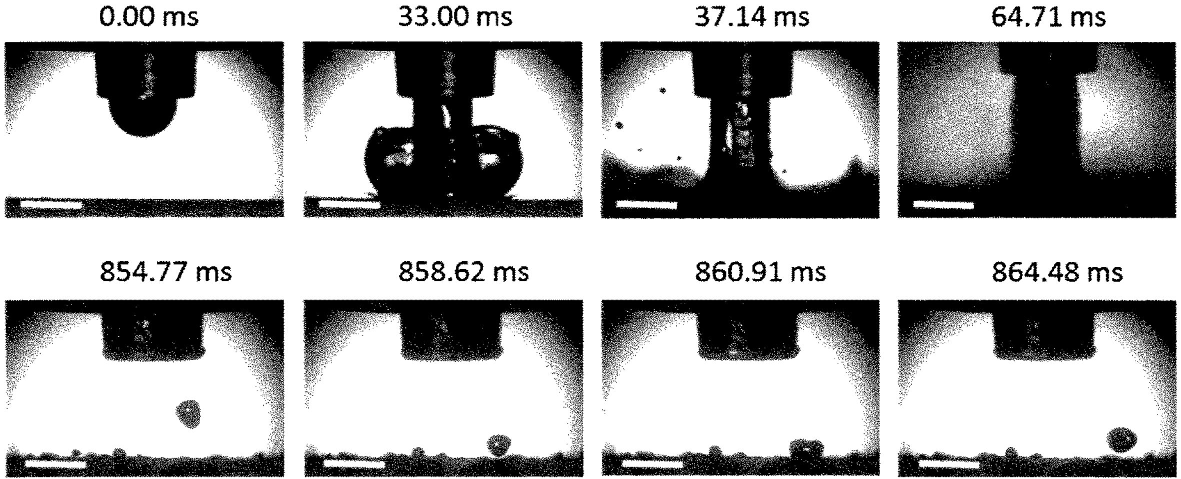
FIG. 14 shows results of the water jet impact tests described in Example 6.

The ability of the PKFE coating to withstand repeated jet impact events was also tested by subjecting it 20 times to 0.25 mm jet at 25 $ms^{-1}$, for ~10 s each time. No damage was incurred. The coating was also tested with impact of jets on a surface inclined at 45° with jets of 0.25 and 2.5 mm diameter, again without damage. Additionally, the impalement resistance of the PKFE coating was tested with water jet speed up to ~35 $ms^{-1}$ using 2.5 mm jet, with $We_l$~43,000; this was at the upper limit of velocity achievable in the pneumatic setup. The results are shown in FIG. 14. The top row images in FIG. 14 capture the jet impact test. The bottom row images capture a remaining water droplet from the nozzle—well after the jet impact test—impacting on the substrate and bouncing off completely. This indicates that after the water jet impact test, the surface showed no signs of damage or impalement by the liquid. This was further tested by water drop roll-off tests, WSA measurements and impact of water droplets, which bounced off completely. Post impact WCA measurements showed a contact angle of 159° (as seen in the right image of FIG. 13) and the surface morphology showed no observable damage (as shown in the bottom row of images in FIG. 13).

Example 7—Comparison with Immiscible Oil Infused Surfaces

Use of Krytox® 1506 (perfluoropolyether) oil ("Krytox") in the present PKFE formulations may raise comparison with recently proposed oil infused liquid repellent surfaces, where immiscibility of oil with water is exploited to obtain low drop sliding angles.

A coating as described in Examples 1 and 2 above was formed and a portion of this coating was treated with Krytox to form a Krytox infused surface portion by gently dropping a few drops of Krytox onto the surface. This resulted in hemi-wicking of Krytox into the surface and formation of a Krytox infused wet part of the surface.

The surface was then inclined to an angle of 45° from horizontal and water droplet mobility was tested across the whole coated surface (part of which was the as-formed coating of Examples 1 and 2 and part of which was the Krytox infused surface). Much faster droplet motion was observed across the PKFE coating compared to the Krytox infused portion of the surface. This confirms a much higher water droplet adhesion with the Krytox infused section as compared to the as-formed surface of Examples 1 and 2.

This confirms that despite use of perfluoropolyether (e.g. Krytox® 1506 oil), the present coating formulation differs from the immiscible oil infused textured surfaces proposed in the art (e.g. SLIPS surfaces—Wong, T. S. et al., *Nature* 477, 443-447, (2011)) in terms of liquid repellency. For oil infused surfaces, immiscibility of the water with the oil (e.g. Krytox) is exploited to achieve low WSA; however, the adhesion of water drops on oil infused surfaces and the drop roll-off speed is controlled by the oil viscosity (as explained in Smith, J. D. et al., *Soft Matter* 9, 1772-1780, (2013)). In fact, the drop roll-off from the present coatings is faster than the Krytox oil infused surfaces. Clearly the Krytox infused (wet) part has much higher drop adhesion.

Therefore, the present coatings in which Krytox is blended into the coating formulation rather than infusing the Krytox on a micro/nanotextured substrate has a clear advantage.

Example 8—Effect of Nanoparticle Concentration on Mechanical Robustness

Figure 15A:
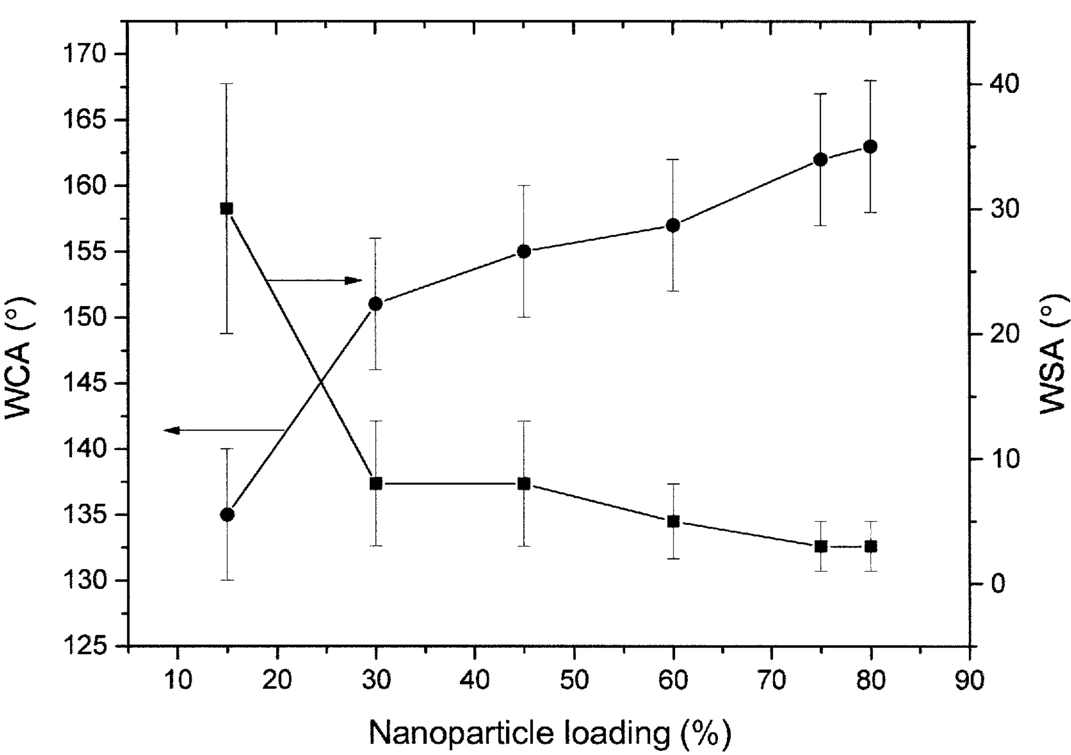
FIG. 15*a* shows effects of nanoparticle loading on WCA and WSA as described in Example 8.
Figure 15B:
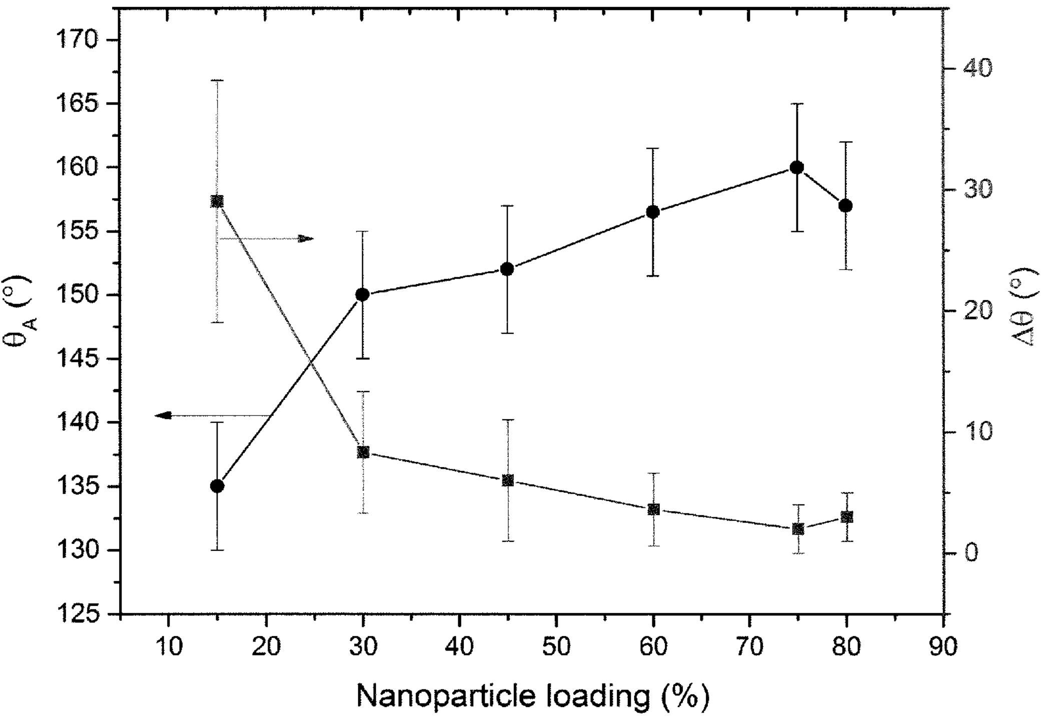
FIG. 15*b* shows effects of nanoparticle loading on advancing contact angle ($\theta_A$) and hysteresis ($\Delta\theta$) as described in Example 8.

PKFE coatings were prepared as in Examples 1 and 2 but with varying PTFE nanoparticle concentrations in order to determine the optimal nanoparticle concentration required for the best possible mechanical robustness while maintaining the excellent water repellency. Before determining its effect on mechanical characteristics, the change in the PKFE nanocomposite WCA, WSA, with the PTFE concentration was explored. Results are plotted in FIG. **15*a* in which filled circles show WCA and filled squares show WSA. Additionally, in FIG. 15*b*** the effect of nanoparticle loading on $\theta_A$ and $\Delta\theta$, the trends are similar to WCA and WSA. However, at 80% loading, a slight decrease in $O_A$ is observed, this is likely due to decrease in dispersion quality at high particle loading.

The substrates in this case were prepared by manual sandpaper (Grit: 240) roughening prior to coating. These results indicate that superhydrophobicity is achieved at nanoparticle loadings exceeding 30 wt. %. For a smooth substrate such as a glass slide, superhydrophobicity was achieved at a higher particle loadings, above 60 wt. %.

Figure 16A:
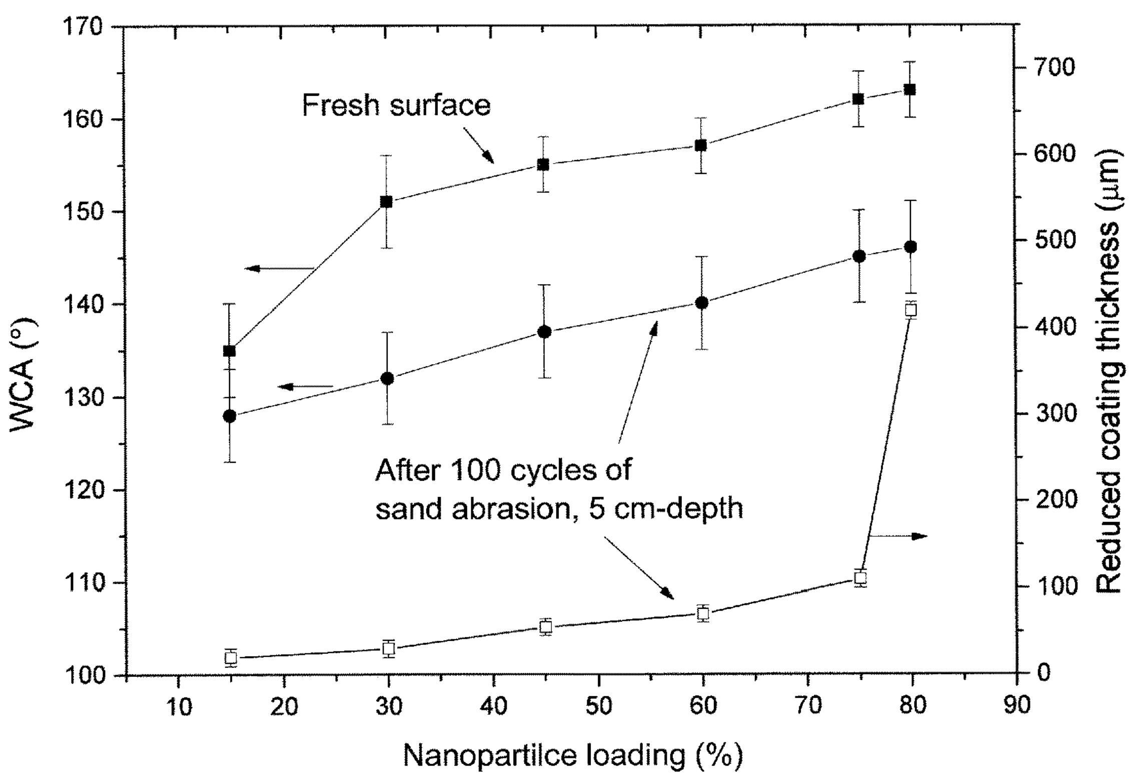
FIG. 16*a* shows the impact of nanoparticle loading on abrasion resistance tested using sand dipping as described in Example 8.

The effect of nanoparticle loading on the sand abrasion resistance (tested as described in Example 4) of the nanocomposite coatings is presented in FIG. **16*a* which shows the coating WCA before and after 100 cycles of sand abrasion. In FIG. 16*a***, filled squares show WCA for the fresh surface, filled circles show WCA after 100 cycles of sand abrasion to a depth of 5 cm as described in Example 4, and open squares show reduction in coating thickness (μm)

following 100 cycles of sand abrasion. Clearly sand abrasion leads to a decrease of WCA. However, for the nanoparticle loadings greater than 70 wt. %, a WCA of ~145° is retained even after the 100 continuous abrasion cycles at 5 cm depth of sand.

It can be seen that for nanoparticle loadings below about 75 wt. %, the thickness reduction of the nanocomposite after abrasion testing is low, indicating that the wear resistance of PKFE coating decreases only slightly with the nanoparticle content. However, above about 75 wt. %, the low interfacial bonding of the PTFE and epoxy and the softness of the PTFE seem to start dominating and result in a reduction in coating thickness with abrasion. Therefore, a 75 wt. % particle loading was found to be optimal for both water repellency and wear resistance.

Figure 16B:
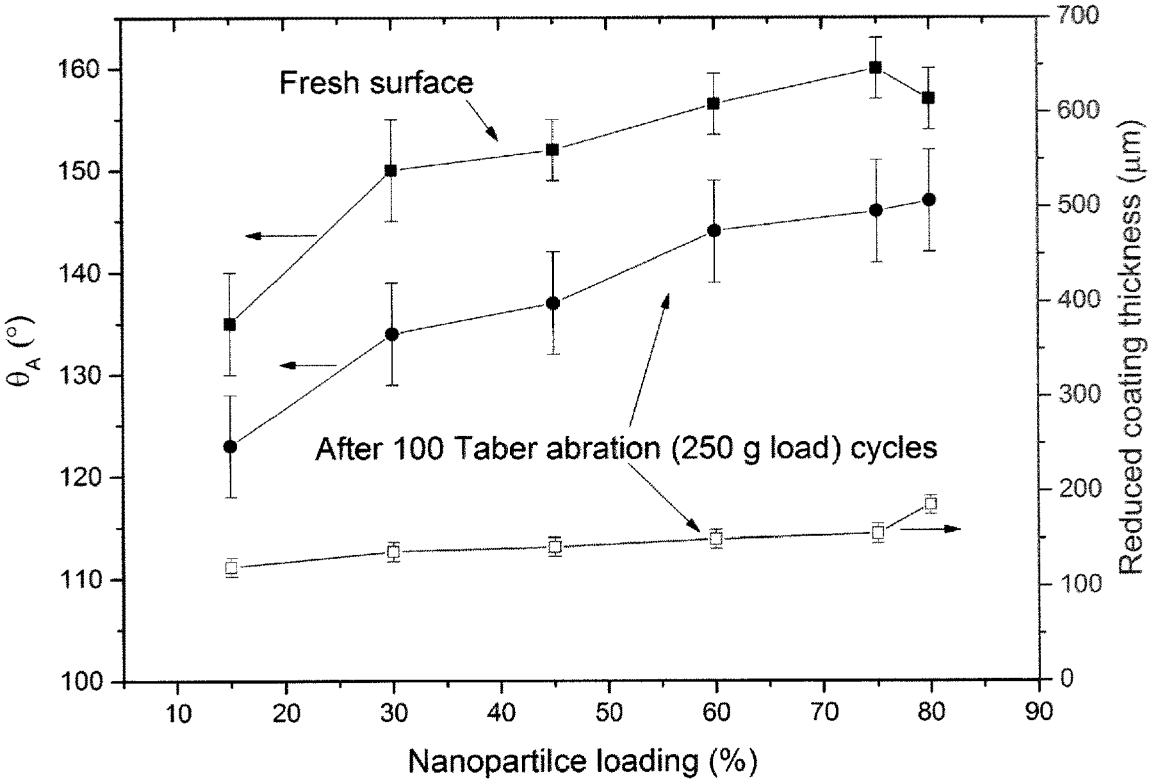
FIG. 16*b* shows the impact of nanoparticle loading on abrasion resistance tested using Taber abrasion test, as described in Example 8.

In FIG. 16*b*, variation of $O_A$ coatings with different nanoparticle loading before and after 100 Taber abrasion cycles at a wheel loading of 250 g is plotted along with coatings thickness reduction as a result of the abrasion.

Example 9—Chemical Resistance

A PKFE coating was prepared by spraying onto a glass microscope slide (sufficient spraying to cover the slide surface) and annealing using the methods as described in Examples 1 and 2 above.

To assess harsh chemical corrosion resistance, aqua regia (a mixture of highly concentrated hydrochloric acid (HCl) and nitric acid ($HNO_3$) in 3:1 volume ratio)—a strongly acidic and very potent oxidising agent—was used. Tests were also undertaken using 1M basic, sodium hydroxide (NaOH) solution. Although such extreme harsh chemical corrosion is not very common in practice, it is a meaningful means to establish the coating chemical robustness.

Figure 17A:
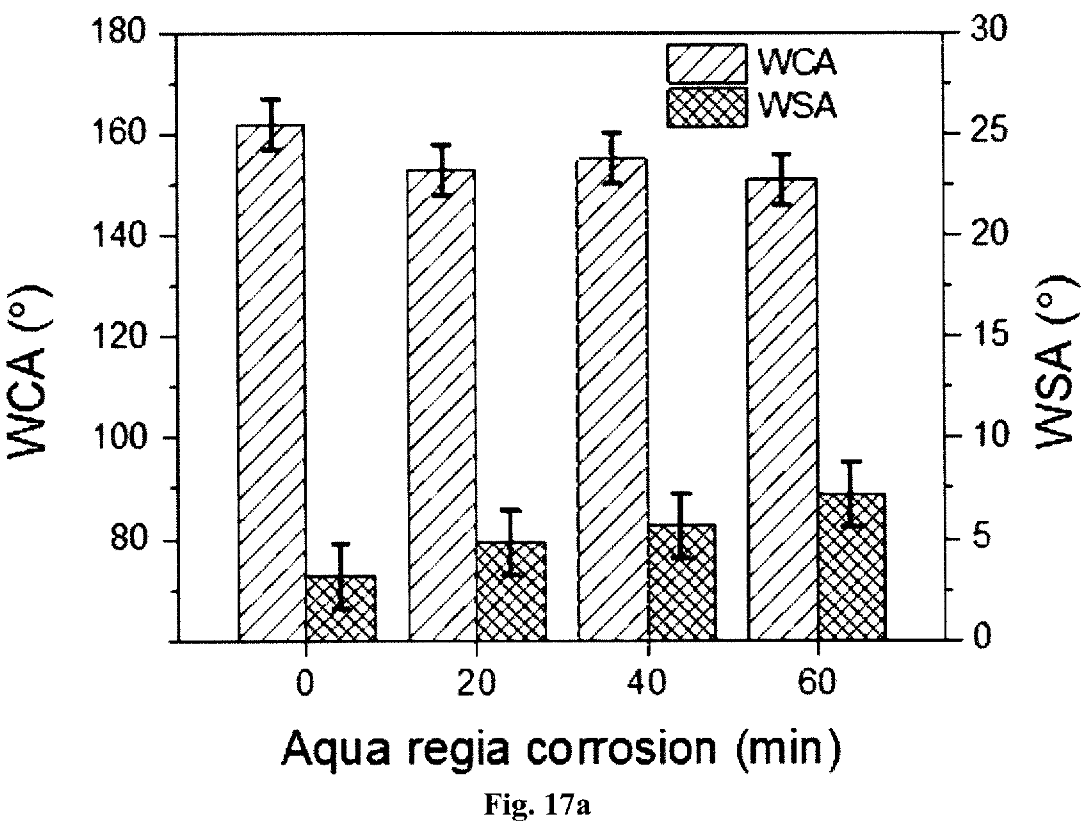
FIG. 17*a* shows the effect of aqua regia corrosion time on WCA and WSA as described in Example 9.
Figure 17B:
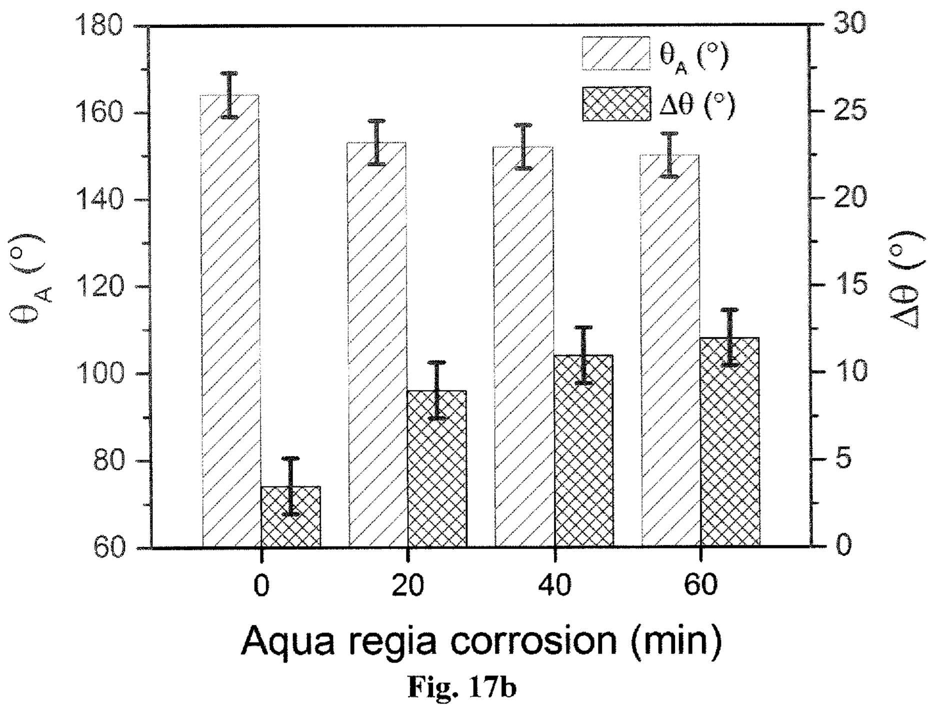
FIG. 17*b* shows the effect of aqua regia corrosion time on $\theta_A$ and $\Delta\theta$ as described in Example 9.
Figure 18:
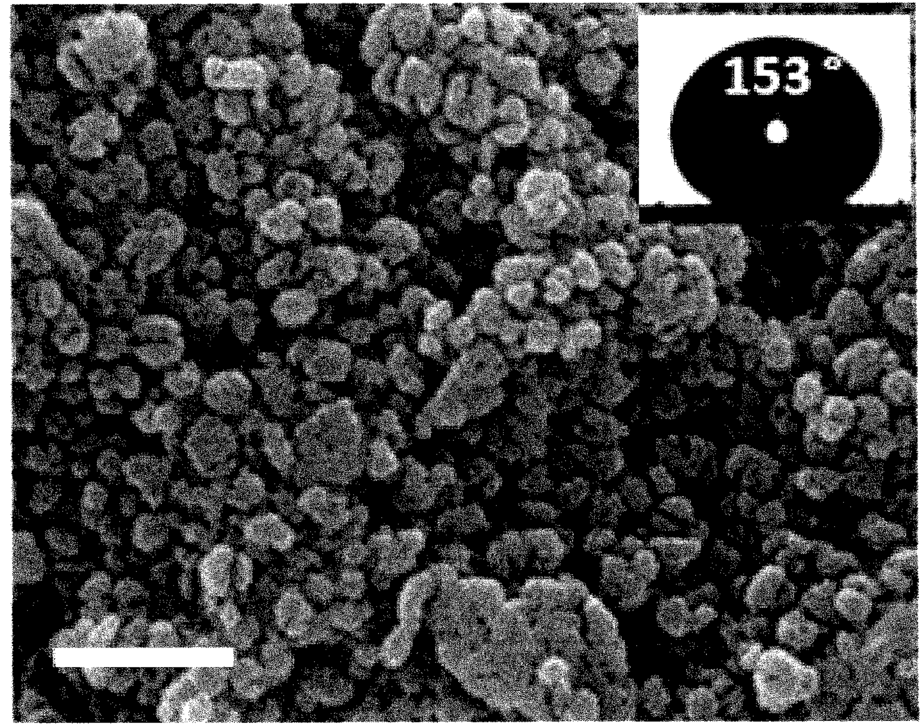
FIG. 18 shows an SEM image after aqua regia treatment as described in Example 9. Scale bar 1 μm.
Figure 19A:
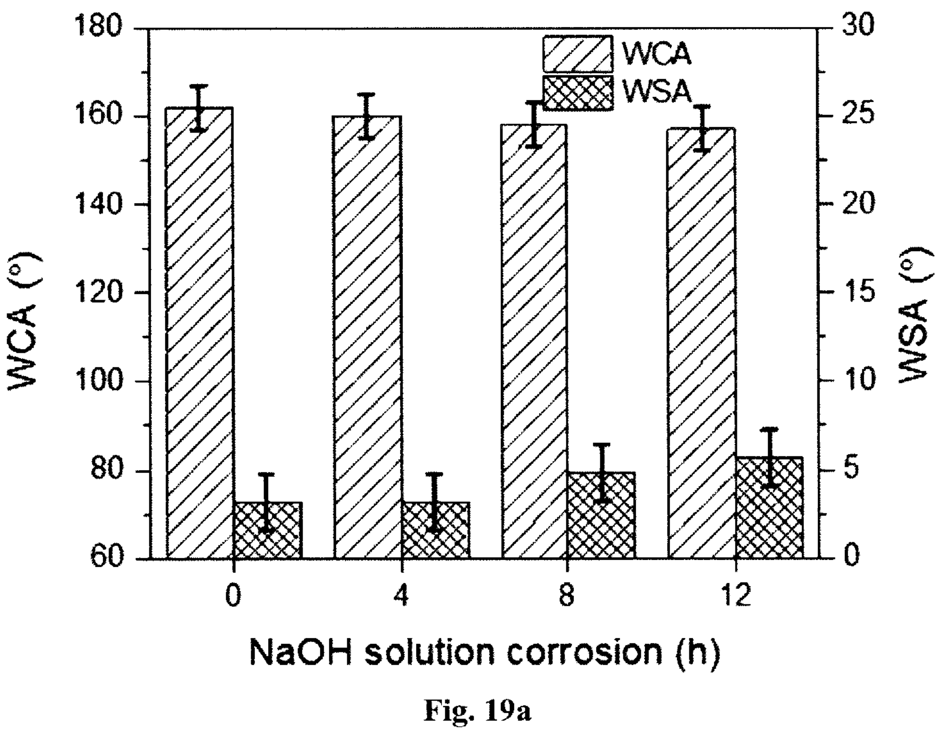
FIG. 19*a* shows the effect of NaOH corrosion time on WCA and WSA as described in Example 9.
Figure 19B:
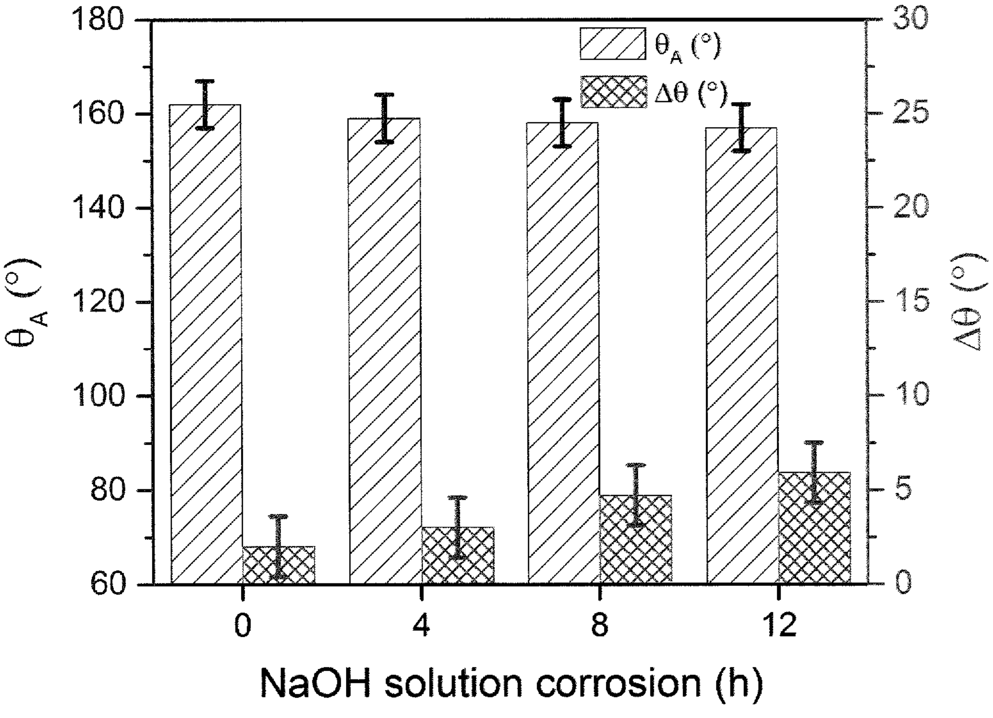
FIG. 19*b* shows the effect of NaOH corrosion time on $\theta_A$ and $\Delta\theta$ as described in Example 9.
Figure 20:
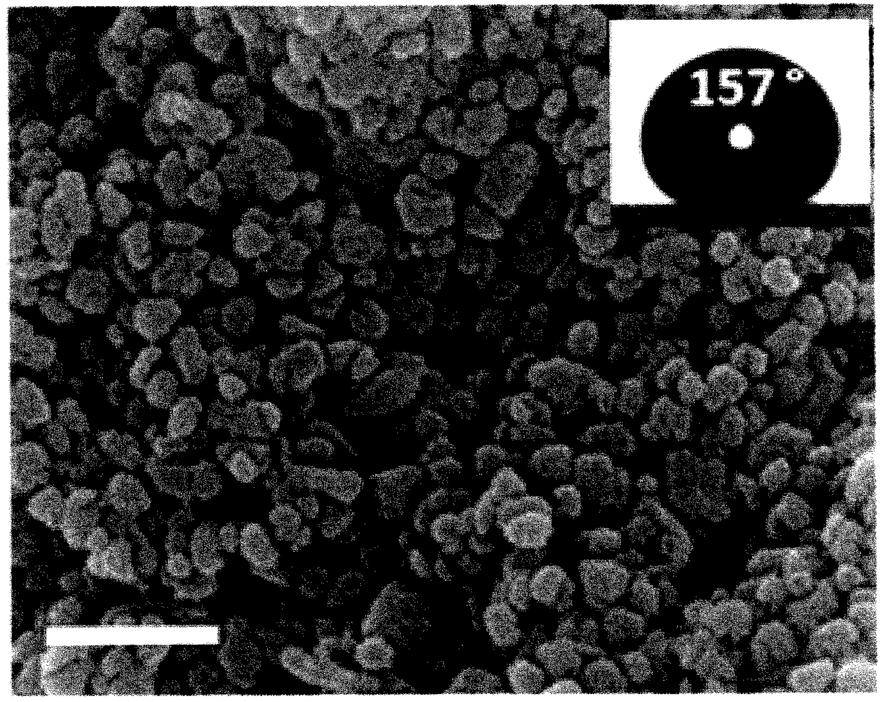
FIG. 20 shows an SEM image after NaOH treatment as described in Example 9. Scale bar 1 μm.

The tests were performed by dipping the coated glass slides into the chemical solutions and periodically removing the samples and measuring the WCA, WSA, $\theta_A$ and $\Delta\theta$ after water rinsing and drying. The results are shown in FIGS. 17-20. FIGS. 17*a* and 17*b* show the effect of aqua regia corrosion time on the water repellency of the coating. Superhydrophobicity (WSA≥150° and WSA<10°, or $\theta_A$≥150° and $\Delta\theta$<10°) was maintained after 60 mins exposure. FIG. 18 shows SEM surface morphology of the PKFE coating after 60 min aqua regia exposure and showed no observable damage. FIGS. 19*a* and 19*b* show the effect of NaOH solution (1M) exposure—the superhydrophobicity is maintained after 12 hours exposure. FIG. 20 shows SEM surface morphology of the PKFE coating after 12 h in 1M NaOH solution. It is therefore demonstrated that the present coatings show exceptional chemical resistance.

Example 10

The performance of a PKFE coating of the present invention (prepared as in Examples 1 and 2) was compared against three different commercially available coatings: HIREC 450 available from NTT-AT, Japan, Ultra-Ever Dry available from UltraTech International, Inc., FL, USA, and NeverWet available from NeverWet LLC, USA. Ultra-Ever Dry and NeverWet are two part coatings, using a primer for adhesion improvement. This is in contrast to HIREC 450 and the present compositions which are formulated a single component sprayable formulation.

Table 1 shows the result of NaOH compatibility tests. The comparative resistance of the various coatings to 1M NaOH solution was tested. All tests were performed in a manner similar to the NaOH resistance test for PKFE outlined in Example 9. $\theta_a$ denotes advancing water droplet contact angle and $\Delta\theta$ the contact angle hysteresis. Commercial coatings were not tested in aqua regia due to the unknown nature of their chemical composition.

TABLE 1

| | Time in 1M NaOH | | | | | |
|---|---|---|---|---|---|---|
| Coating | 0 mins | 10 mins | 30 mins | 1 hr | 2 hr | 4 hr |
| HIREC 450 | | Damaged | | | | |
| Ultra-Ever Dry | $\theta_a$: 166°<br>$\Delta\theta$: 5° | $\theta_a$: 162°<br>$\Delta\theta$: 12° | $\theta_a$: 161°<br>$\Delta\theta$: 13° | $\theta_a$: 158°<br>$\Delta\theta$: 18° | $\theta_a$: 155°<br>$\Delta\theta$: 50° | Damaged |
| Never Wet | $\theta_a$: 157°<br>$\Delta\theta$: 6° | $\theta_a$: 153°<br>$\Delta\theta$: 8° | Damaged | | | |

Note that whereas PKFE maintains superhydrophobicity after 12 h of 1M NaOH exposure (as demonstrated in Example 9), the tested commercial coatings become damaged in a maximum of a few hours, with HIREC 450 lasting only 10 minutes and NeverWet only 30 minutes before damage and loss of hydrophobic properties ($\Delta\theta$>10°).

The relative difference in the mechanical integrity of the coatings was tested using repeated tape peeling tests and is summarised in Table 2. Each tape peel was performed by applying the tape and rolling a weight of ~4 kg on the tape for uniform application. Some commercial coatings showed mechanical damage (e.g. Ultra-Ever Dry and NeverWet) after a few peeling cycles. HIREC 450 loses superhydrophobicity (with $\Delta\theta$: 50°) after 5 peeling cycles. The PKFE coatings formed in Examples 1 and 2 maintained excellent superhydrophobicity even after 30 peeling cycles.

TABLE 2

| Coating type | Tape peel performance |
|---|---|
| HIREC 450 | $\Delta\theta$: 50° after 5 peeling cycles. Droplet pinned (stuck) after 10 peeling cycles |
| Ultra-Ever Dry | Coating physically damaged after 5 peeling cycles |
| NeverWet | Coating physically damaged 3 peeling cycles |
| PKFE (Examples 1 and 2) | $\theta_a$: 155° and $\Delta\theta$: 5° after 30 peeling cycles |

The tape used was high adhesion tape (3M, VHB 4910, adhesion to steel: 2,600 N/m). Each tape peel was performed (as in Example 3) by applying the tape and rolling a weight of ~4 kg on the tape for uniform application. Then the tape was peeled off at 90°. Some commercial coatings showed mechanical damage (e.g. Ultra-Ever Dry and NeverWet) after few peeling cycles: these coatings use a soft top coat on top of primer layer, thus a failure upon repeated peeling cycles is to be expected. NTT-AT HIREC 450 loses superhydrophobicity (with hysteresis ($\Delta\theta$) increasing to 50°) after 5 peeling cycles. The PKFE coatings of the present invention maintained excellent superhydrophobicity even after 30 peeling cycles.

Therefore, from above two set of tests the superiority of the PKFE over the tested commercial coatings is clear.

Example 11

The Water Contact Angle (WCA) was measured as an indicator of hydrophobic nature for a number of different surface coatings. The coatings were prepared in line with the general procedures set out in Examples 1 and 2. Results are shown in FIGS. 1-4. The coatings are formulated as set out in table 3.

TABLE 3

| Composition | Component | | | |
|---|---|---|---|---|
| | Epoxy Resin (AIRSTONE ™ 760E) | Fluorinated Amine (formed as in Example 2) | Lubricant (Krytox ® 1506 oil) | Nanoparticles (PTFE particles as used in Example 1) |
| a | ✓ | | | |
| b | ✓ | ✓ | | |
| c | ✓ | ✓ | ✓ | |
| d | ✓ | ✓ | ✓ | ✓ |

It can be seen by comparison of these figures that sample d) in which the coating composition included all four components showed the best superhydrophobic behaviour. Omission of any one of the fluorinated amine, lubricant, or nanoparticles resulted in distinct degradation of the hydrophobic properties to the extent that these properties fell out of the "superhydrophobic" range.

Droplet roll-off tests were also performed for samples in which the fluorinated amine and PTFE particles were omitted from the composition. For this sample water droplets showed significant sticking on the surface of the sample on tilting indicating a degradation of the superhydrophobic properties.

The invention claimed is:

1. A composition for forming a hydrophobic material, the composition made by combining:

a fluorinated amine compound comprising at least two amine moieties;

an epoxy compound comprising at least two epoxy moieties;

a lubricant which is a perfluorinated polyether or a silicone oil;

a population of nanoparticles; and a solvent.

2. A composition according to claim 1, wherein the epoxy compound is selected from bisphenol di- or poly-glycidyl ether compounds.

3. A composition according to claim 2, wherein the epoxy compound is selected from bisphenol-A, bisphenol-AP, bisphenol-B, bisphenol-BP, bisphenol-C, bisphenol-E, bisphenol-F, bisphenol-G, bisphenol-M, bisphenol-P, or bisphenol-PH.

4. A composition according to claim 1, wherein the fluorinated amine compound is made by combining a straight or branched chain $C_{1-10}$ alkyl amine having at least two amine groups per molecule, with a straight or branched chain $C_{1-12}$ fully or partially fluorinated carboxylic acid containing at least one —COOH group per molecule.

5. A composition according to claim 4, wherein the fluorinated amine compound is made by combining an amine selected from diethylenetriamine, triethylenetetramine, tetraethylenepentamine, and ethylenediamine; with a carboxylic acid selected from trifluoroacetic acid, pentafluoropropionic acid, heptafluorobutyric acid, heptafluoroisobutyric acid, nonafluorovaleric acid, nonafluoroisovaleric acid, nonafluoropivalic acid, difluoroacetic acid, 3,3,3-trifluoropropionic acid, 3,3,3-trifluoromethyl-2-trifluoromethylpropionic acid, (R,S)-5,7-difluorotryptophan hydrochloride, (R,S)-5,6,7-trifluorotryptophan hydrochloride, 2-amino-3-(4,5,6,7-tetrafluoro-1H-indol-3-yl) propionic acid hydrochloride, and (R,S)-4,5,6,7-tetrafluorotryptophan hydrochloride.

6. A composition according to claim 4, wherein the amine and the fully or partially fluorinated carboxylic acid are combined to form the fluorinated amine compound in an amine:carboxylic acid molar ratio in the range 1:0.75-1:2.

7. A composition according to claim 1, wherein the lubricant is a perfluorinated polyether.

8. A composition according to claim 7, wherein the perfluorinated polyether is a fluorocarbon ether polymer of polyhexafluoropropylene oxide having a chemical formula II:

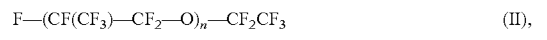

$$F—(CF(CF_3)—CF_2—O)_n—CF_2CF_3 \quad (II),$$

wherein n is in the range 10 to 60.

9. A composition according to claim 1, wherein the nanoparticles in the population of nanoparticles are formed from material selected from $TiO_2$, $SiO_2$, ZnO, MnO, PTFE, $CeO_2$, graphene, graphene oxide, carbon nanotubes, and carbon black.

10. A composition according to claim 1, wherein the amount of nanoparticles included in the composition is below about 80 wt. % of the composition excluding solvent.

11. A hydrophobic material formed by evaporation of solvent from a composition according to claim 1, the hydrophobic material comprising:

a cured fluorinated epoxy resin;

the lubricant; and the population of nanoparticles.

12. An intermediate for forming a composition according to claim 1, wherein the intermediate is made by combining:

the epoxy compound comprising at least two epoxy moieties;

the fluorinated polyether;

the population of nanoparticles; and the solvent.

13. A kit comprising an intermediate according to claim 12, and a fluorinated amine compound comprising at least two amine moieties.

14. An article made from or coated with a composition according to claim 1 or a hydrophobic material formed by evaporation of solvent from a composition according to claim 1, the hydrophobic material comprising:

a cured fluorinated epoxy resin;

the lubricant; and the population of nanoparticles.

15. A method of applying a hydrophobic coating to an article, the method comprising applying a composition according to claim 1 to the surface of the article, and heating the article and coating in air at between 8° and 120° C.

* * * * *